(12) United States Patent
White et al.

(10) Patent No.: US 7,294,254 B2
(45) Date of Patent: Nov. 13, 2007

(54) WASTEWATER TREATMENT SYSTEM

(75) Inventors: Rocky R. White, Lilburn, GA (US); Lawrence J. Bradford, Atlanta, GA (US)

(73) Assignee: Njun, LLC, Atlanta, GA (US)

( * ) Notice: Subject to any disclaimer, the term of this patent is extended or adjusted under 35 U.S.C. 154(b) by 491 days.

(21) Appl. No.: 10/900,979

(22) Filed: Jul. 28, 2004

(65) Prior Publication Data

US 2006/0021924 A1    Feb. 2, 2006

(51) Int. Cl.
*C02F 3/00* (2006.01)

(52) U.S. Cl. ............... 210/119; 210/123; 210/124; 210/195.3; 210/197; 210/220; 210/532.2; 210/540

(58) Field of Classification Search ............. 210/195.3, 210/197, 119, 123–124, 220, 532.2, 540
See application file for complete search history.

(56) References Cited

U.S. PATENT DOCUMENTS

| | | | |
|---|---|---|---|
| 4,608,157 A | 8/1986 | Graves | 210/86 |
| 4,986,905 A * | 1/1991 | White | 210/104 |
| 5,647,986 A | 7/1997 | Nawathe et al. | 210/608 |
| 5,895,566 A | 4/1999 | Tittlebaum et al. | 210/86 |
| 6,113,788 A | 9/2000 | Molof et al. | 210/605 |
| 6,200,472 B1 | 3/2001 | Donald et al. | 210/195.1 |
| 6,409,914 B1 | 6/2002 | Keppeler | 210/151 |
| 6,638,420 B2 * | 10/2003 | Tyllila | 210/86 |
| 6,712,970 B1 | 3/2004 | Trivedi | 210/605 |

* cited by examiner

*Primary Examiner*—Chester T. Barry
(74) *Attorney, Agent, or Firm*—Merchant & Gould

(57) ABSTRACT

A localized wastewater treatment system for biologically treating wastewater. Raw wastewater flows into a first operational area where a majority of solid material in the wastewater separates out of the wastewater and is retained in a solids area positioned below the first operational area. As the wastewater continues to flow into the first operational area, the wastewater overflows from the first operational area to a second operational area. Once the wastewater in the second operational area reaches a predetermined volume, a batch of the wastewater is transferred from the second operational area to a third operational area where the batch of wastewater is biologically treated by a population of microorganisms contained within a solids area located beneath the third operational area. The treated wastewater is then removed from the third operational area for dispersal.

42 Claims, 14 Drawing Sheets

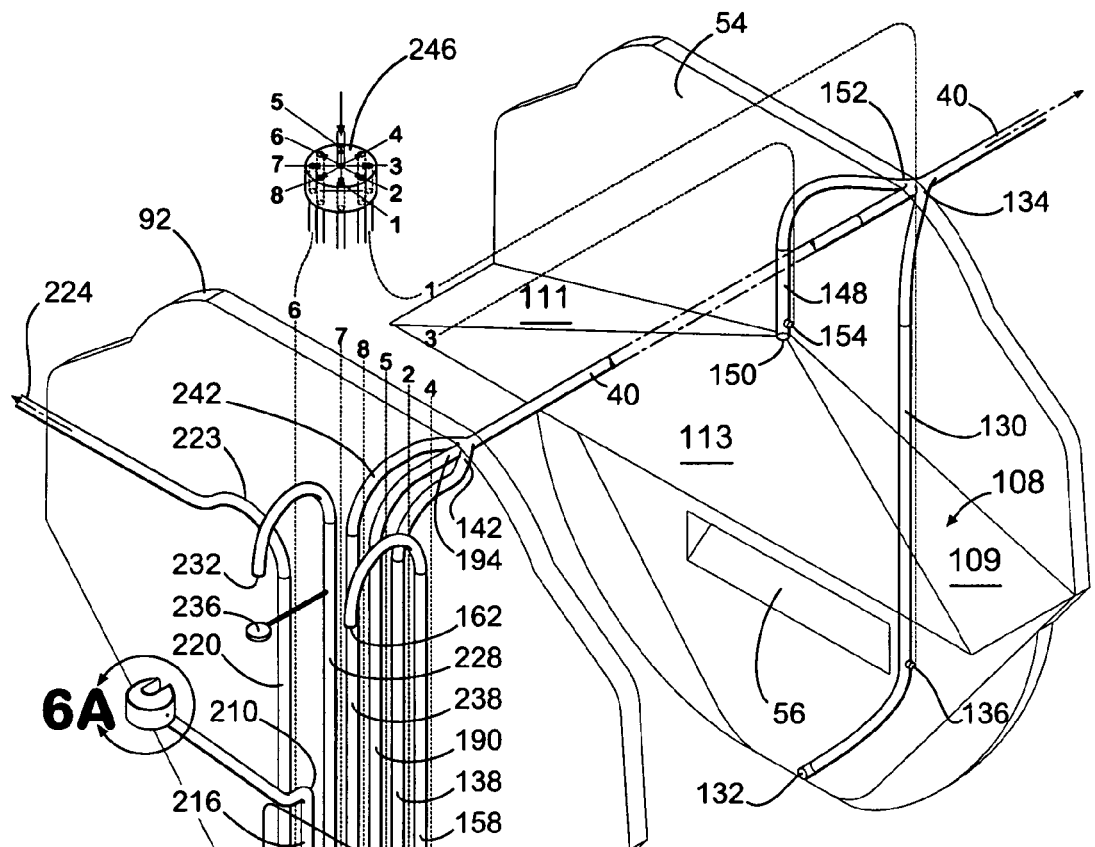
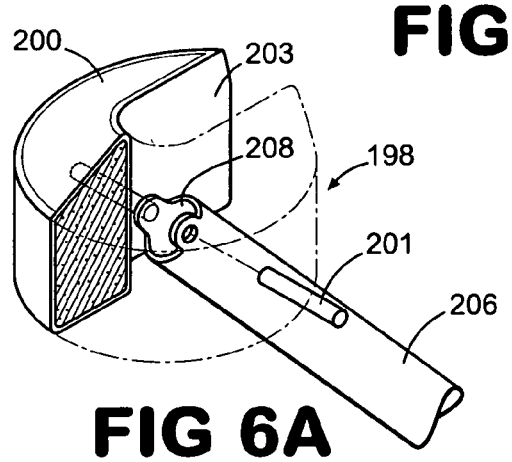
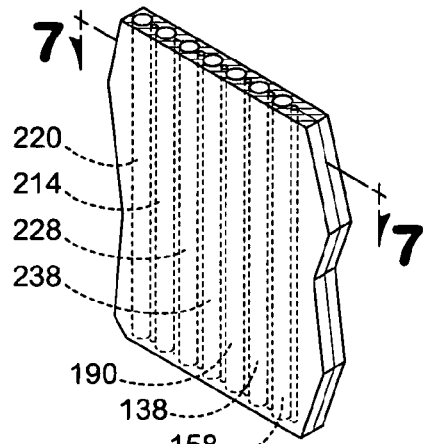
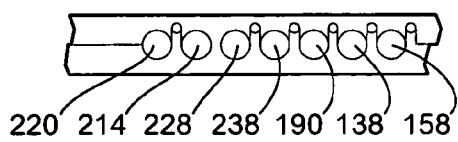
FIG 6
FIG 6A
FIG 6B
FIG 7

WASTEWATER TREATMENT SYSTEM

BACKGROUND OF THE INVENTION

In order to protect the environment and promote public health, communities require wastewater treatment. The discharge of untreated wastewater is not an option, since it gives rise to numerous environmental concerns. Untreated wastewater contains bacteria that consume high quantities of dissolved oxygen, which is commonly measured as the level of biochemical oxygen demand (BOD) in the water. Thus, when untreated wastewater is released into either aboveground or belowground streams and aquifers, the level of dissolved oxygen in the water of the streams and aquifers begins to deplete, which endangers the water bodies themselves and the resident plant and aquatic life. Over time, the bacteria of the untreated wastewater will deplete the dissolved oxygen in the water to a level that will not support plant and aquatic life.

To treat wastewater, communities in highly populated areas commonly collect wastewater and transport it through a series of underground pipes to a centralized wastewater treatment plant. However, there are several problems associated with centralized treatment plants. Centralized wastewater treatment plants are designed and rated for processing a specific flow rate of wastewater per day, typically expressed as the rated capacity of the plant, and all treatment plants have a maximum flow rate capacity. Thus, if a centralized treatment plant receives more wastewater on a particular day than what the plant was designed to handle, problems are encountered. For instance, when a treatment plant receives larger-than-normal amounts of untreated raw wastewater, a portion of the untreated wastewater must be diverted into a body of water, such as a river, in order not to exceed the amount of wastewater the plant was designed to handle. As discussed above, discharge of this untreated wastewater into bodies of water will eventually endanger and kill resident plant and aquatic life in the water. Untreated wastewater also contains a number of disease pathogens that are extremely harmful to humans. For instance, untreated wastewater is one of the leading causes of dysentery, which can be life threatening if not properly treated. Thus, if a significant amount of untreated wastewater is discharged into a body of water, that body of water will become unavailable for human consumption. On the other hand, if the treatment plant processes the larger-than-normal amounts of untreated wastewater, instead of diverting a portion into a body of water, the influx of untreated wastewater would wash away the bacteria populations used by the plant to treat the untreated wastewater, which would disrupt the entire biological treatment process of the plant.

Larger-than-normal amounts of untreated wastewater commonly occur because of growth in commercial and residential developments beyond what the centralized wastewater treatment plants were designed to accommodate and because of large amounts of rainfall in a short period of time. Moreover, sewage lines connecting residences and businesses to centralized wastewater treatment plants often develop breaks and cracks which allow rainwater and ground water to seep into the sewage lines. This phenomenon, known as sewage line infiltration, also causes larger-than-normal amounts of wastewater to flow into the centralized treatment plants. Wastewater treatment plants require tremendous community resources in order to accommodate the demands and challenges generated by community growth and development. Often, these resources are not immediately available, and the existing treatment plants are not able to properly treat the increased flow rate of untreated wastewater.

In more rural areas, construction of centralized wastewater treatment plants may be too expensive to build and maintain. In addition, the cost of connecting residences and businesses in rural areas to a centralized treatment plant via sewage lines may be impracticable due to the greater distance between the those residences and businesses. In such areas septic systems are usually utilized to treat wastewater. A septic tank is typically a large tank located underground on an owner's property. Septic tanks are categorized as continuous flow systems because wastewater flows into the septic tank at one end, and the same amount of wastewater that entered will exit the tank at the other end. The purpose of a septic tank is to retain any solids in the wastewater and to allow the liquid wastewater to pass through to prevent field lines leading from the septic tank to a drain field from becoming clogged. However, since the wastewater leaving the septic tank has not been treated, the wastewater will be a detriment to the environment, as discussed above. Furthermore, as solids build up inside the septic tank, a phenomenon known as periodic upset may occur, causing solids to flow out of the septic tank and into the field lines connected to the tank. Eventually, these field lines will clog due to the buildup and carryover of solids. When this occurs, the field lines have to be excavated and cleaned, which means destruction to a portion of the owner's property as well as increased expense to the owner.

Because wastewater leaving a septic tank has not been treated, drain fields covering a certain minimum area of soil are required to filter the wastewater. That minimum area is influenced by factors including the amount of wastewater produced by the household and the soil percolation rate. Different kinds of soil have different percolation rates, and a larger or smaller drain field will be required depending on the characteristics of the soil. Because the percolation rate of soil determines the minimum lot size in a subdivision using septic tanks, the requirement for larger minimum lots where percolation is relatively poor reduces the maximum number of lots available in that subdivision, and the resulting increase in the cost of those lots is passed on to the home buyers.

In view of the problems encountered with using septic tanks to handle wastewater, on-site alternative wastewater treatment systems have been proposed in attempt to cure the deficiencies of septic tanks. A number of the commercially available on-site wastewater treatment systems utilize the continuous flow system discussed above with regard to septic tanks. In a continuous flow system, no wastewater leaves the system unless wastewater enters the system, and unlike at a centralized wastewater treatment plant, there is no operator available at these on-site treatment systems to determine and adjust to changes in flow rate of wastewater entering the systems. Therefore, if a residence or business does not generate any new wastewater for a period of time, such as for several hours or a couple of weeks, the wastewater in these on-site treatment systems remains in the systems because no new wastewater is available to push any wastewater out of the systems.

To treat wastewater, these on-site treatment systems either continuously aerate, or aerate at set periodic times such as every four, eight, or twelve hours, the wastewater. However, in continuous flow systems, there is nothing available to separate the untreated wastewater from the treated wastewater or to distinguish wastewater that has not been treated from wastewater that has been treated, once the two are mixed. Consequently, untreated wastewater is often discharged from continuous flow systems because of this lack of control over what actually gets pushed out of the systems.

Other on-site alternative wastewater treatment systems utilize a pump configuration to transfer wastewater throughout the systems. Although these systems may control when wastewater is discharged from the systems, the systems do not control what is actually getting discharged from the systems because, like the continuous flow systems, there is nothing available in the pump systems to separate the untreated wastewater from the treated wastewater or to distinguish wastewater that has not been treated from wastewater that has been treated, once the two are mixed. As a result, untreated wastewater is often discharged from the pump systems. Moreover, pump systems are expensive to maintain because certain objects commonly found in wastewater often clog the pumps and valves required to control the flow of wastewater through the system, causing frequent maintenance and replacement.

Further, many of the on-site alternative wastewater treatment systems require the property owners to perform daily or periodic adjustments to the systems. Such maintenance is expensive and also cumbersome to the property owner, who is typically inexperienced with regard to wastewater treatment. Often, property owners are not able to determine what the problem is with the system because of the sophistication of the wastewater treatment process. This sophistication also causes property owners not to want to get involved with any daily or periodic adjustments to the system.

Accordingly, an on-site wastewater treatment system capable of separating treated wastewater from untreated wastewater so that treated wastewater is discharged from the system while untreated wastewater is retained in the system is needed. Moreover, an on-site wastewater treatment system having a cost efficient and reliable means of discharging treated wastewater from the system is also needed.

SUMMARY OF THE INVENTION

Stated in general terms, the present invention comprises an improved localized wastewater treatment system positioned at the site of raw wastewater generation. The system includes areas to receive and treat a continuous inflow of wastewater, and a treatment area to which batches of the wastewater are periodically transferred for treatment separately from the inflow to the system. All functions of the system, including movement of the influent through the system, are carried out either by gravity flow or by selective application of compressed air, eliminating the expense and maintenance requirements of mechanical pumps and valves in the wastewater flow streams.

Stated somewhat generally, wastewater, or influent, flows from a residence or business into a first operational area according to the present invention. The majority of solid material in the wastewater received by a first operational area separates out of the wastewater down to a solids settling area located below the first operational area. As the wastewater continues to flow into the first operational area, the wastewater overflows from the first operational area to a second operational area. Once the wastewater in the second operational area reaches a predetermined volume, a batch of the wastewater is transferred from the second operational area to a third operational area. The batch of wastewater transferred to the third operational chamber undergoes an anoxic period for a predetermined amount of time during which nutrients are removed from the wastewater. At the end of the anoxic period, the batch of wastewater undergoes an aerobic period for a predetermined amount of time, during which principal aerobic treatment of the wastewater occurs. A population of microorganisms contained within a solids area located beneath the third operational area mixes with the wastewater, during the aerobic period, and biologically treats the wastewater. At the end of the aerobic period, the wastewater undergoes a clarification period for a predetermined amount of time, during which the population of microorganisms settle out of the wastewater and down to the solids area, leaving a layer of treated wastewater above the settled population of microorganisms. The treated wastewater is then removed from the third operational area for dispersal, and a predetermined portion of the population of microorganisms may be removed from the solids area to control the length of time the microorganisms remain in the system. During treatment of the batch of wastewater in the third operational area, no new wastewater enters the third operational area.

Stated more particularly, the present invention initially receives wastewater from a residence or business into a first chamber, known as the receiving chamber. The receiving chamber comprises a solids settling area for receiving solid material settling out of the wastewater, a first operational area located above the solids area for receiving wastewater to be processed, and a holding area located above the first operational area for receiving an amount of wastewater above the average amount of flow historically received from a particular residence or business within a predetermined period of time. Inside the receiving chamber, the majority of solid material in the wastewater sinks to the solids settling area, and the majority of the scum floats to the surface of the wastewater in the receiving chamber. The flow of wastewater into the receiving chamber displaces and mixes with wastewater already located in the receiving chamber. Some degree of anaerobic biological treatment of organic matter contained in the wastewater naturally takes place inside the receiving chamber.

The receiving chamber is sized to retain the incoming wastewater for a predetermined amount of time to allow solid material in the wastewater to separate out, without allowing the wastewater to become septic. If the capacity of the receiving chamber is too small relative to the expected maximum inflow of wastewater from a residence or business, then solids in the wastewater will not have time to settle out and, thus, will be transferred with the wastewater through the wastewater treatment system. On the other hand, if the capacity of the receiving chamber is too large, the wastewater will remain in the receiving chamber too long, allowing growth of bacteria which slows the entire biological treatment process.

The wastewater located within the first operational area flows into a second chamber, known as the intermediate or equalization chamber. That flow may take place through an outlet opening, disposed at a level below the first operational area, connecting the receiving chamber to the equalization chamber. The receiving chamber may also include a filter passage including a first baffle and a second baffle arranged around the outlet opening to prevent settleable and floatable solid material from flowing over to the equalization chamber with the wastewater and to divert the wastewater from the first operational area to the outlet opening. The equalization chamber comprises a second operational area for receiving wastewater transferred over from the receiving chamber and two solids settling areas located below the second operational area for receiving any solid material that may settle out of the wastewater transferred from the receiving chamber. Solid material that either settles down to the solids settling areas of the equalization chamber or floats to the surface of the wastewater may be removed and transferred, via an airlift system, to the receiving chamber. The airlift system is an air-driven transfer system that utilizes compressed air to transfer solid material from the equalization chamber and return the solid material to the receiving chamber.

Once the wastewater in the second operational area of the equalization chamber reaches a predetermined volume, a batch of the wastewater, having a predetermined volume based on the daily flow of wastewater received from a particular residence or business, is transferred to a third chamber, known as the reaction chamber, via the airlift system. Any new wastewater entering the system will not mix with the batch of wastewater in the reaction chamber because, unlike the receiving and equalization chambers, there is no open connection between the reaction chamber and the equalization chamber. The reaction chamber comprises a third operational area for receiving a batch of wastewater to process and an activated sludge area located below the third operational area for holding a population of microorganisms used in the biological treatment of the wastewater.

After the batch of wastewater is received in the third operational area of the reaction chamber, the wastewater undergoes an anoxic period for a predetermined amount of time, during which nutrient removal takes place. When a new batch of wastewater is received in the third operational area of the reaction chamber, the population of microorganisms in the activated sludge area of the reaction chamber initially mixes with the incoming wastewater and biologically removes nutrients from the wastewater due to the introduction of a carbon source, namely, the new batch of wastewater, and the lack of dissolved oxygen available in the reaction chamber after processing a previous batch of wastewater.

At the end of the anoxic period, an aerobic period begins in the reaction chamber. During the aerobic period, wastewater is aerated for a predetermined amount of time based on the volume of the batch of wastewater. This aeration causes the wastewater within the operational area of the reaction chamber to mix with the population of microorganisms contained in the activated sludge area. The shape of the reaction chamber also promotes mixing. Aeration is terminated at the end of an aerobic period, and the population of microorganisms is allowed to settle out of the liquid for a predetermined period of time, known as the clarification period. By the end of the clarification period, the population of microorganisms has almost completely separated from the liquid contained in the reaction chamber. The resulting liquid, or effluent, thus is biologically treated and is safe to be discharged into the environment through any suitable manner such as drain fields, spraying, direct discharge, municipal sewer lines, or the like.

The localized wastewater treatment system includes a processor capable of controlling when and how much wastewater is transferred to the third operational area for biological treatment. The processor is also capable of controlling the length of times of the anoxic period, aerobic period, and clarification period. The processor monitors and stores the daily flow activity of the system to identify and accommodate trends in the flow activity. A central control and monitoring system located offsite from the localized wastewater treatment system communicates with the localized system to reprogram the processor at the localized system with updated information and to receive from the localized system any reports of malfunction or other abnormal events associated with the system.

BRIEF DESCRIPTION OF THE DRAWINGS

FIG. 6 is an exploded view of an airlift system of the wastewater treatment system shown in FIG. 1;

FIG. 6A is an enlarged view of a float assembly taken at inset 6A in FIG. 6;

FIG. 6B is an enlarged view of a portion of the airlift system taken at inset 6B in FIG. 6;

FIG. 7 is a cross-sectional view of the airlift system taken along lines 7-7 in FIG. 6B but showing an alternate pipe layout in which the liquid pipes are in a separate plane from the air pipes;

DETAILED DESCRIPTION OF THE PREFERRED EMBODIMENT

Figure 1:
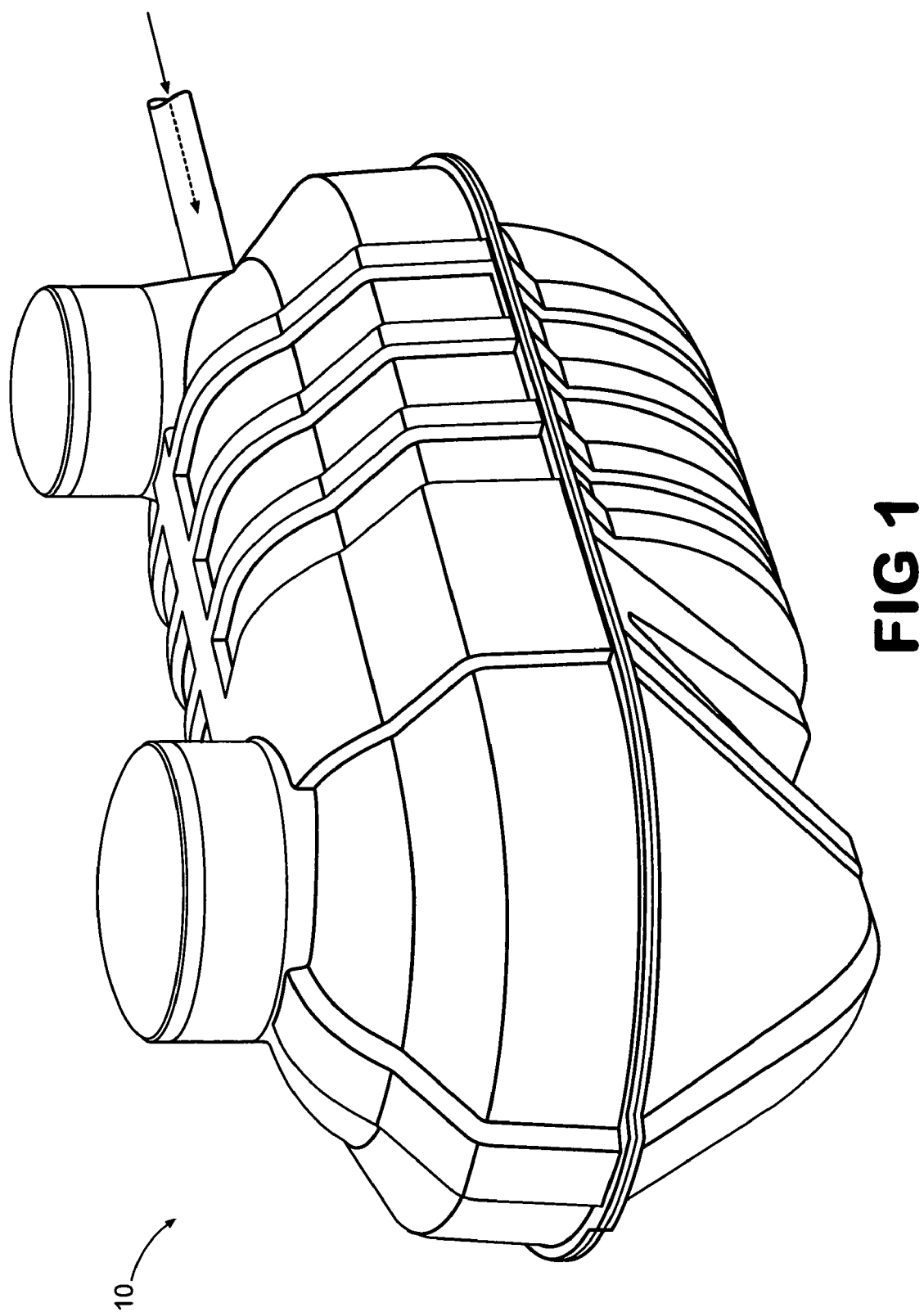
FIG. 1 is a perspective view of a wastewater treatment system according to a preferred embodiment of the present invention.

There are typically two types of solids present in wastewater. The first is inorganic solids, which do not break down or decompose by biological treatment. The inorganic content in wastewater is typically very small. The second type of solids typically present in wastewater is organic solids. Aerobic biological treatment processes, such as those used by certain embodiments of the present invention, rely on a population of microorganisms to break down the organic solids. A wastewater treatment system according to the present invention must, therefore, grow and maintain a population of bacteria in order to consume the organic waste. Under aerobic conditions, the reduced organic compounds are oxidized to end products of carbon dioxide and water.

An embodiment of a wastewater treatment system according to the present invention is shown in FIGS. 1-5. Wastewater in the form of raw sewage is supplied as influent to a localized wastewater treatment system 10 comprising a tank 20 through an inlet opening 30 at one end of the tank. The tank 20 has a plurality of chambers, each chamber having a plurality of areas for treating wastewater. The influent typically flows through a series of pipes leading from a building or residence to the localized treatment system. After passing through the inlet opening 30, the wastewater enters a receiving chamber 50 having a first side wall 52 curving downwardly toward a bottom 78, a second side wall 54 opposing the first side wall, a front wall, a rear wall opposing the front wall, and a top 76 opposing the bottom. The entering wastewater encounters a baffle 32 just inside the inlet opening 30, which slows the flow rate velocity of the arriving wastewater entering the receiving chamber 50 and directs the wastewater downwardly toward the curved first side wall 52 and the bottom 78 of the receiving chamber, as indicated by the directional arrows in FIG. 3A. At this slower inflow rate, the wastewater begins naturally separating into wastewater constituents, including solid and liquid material.

Figure 10A:
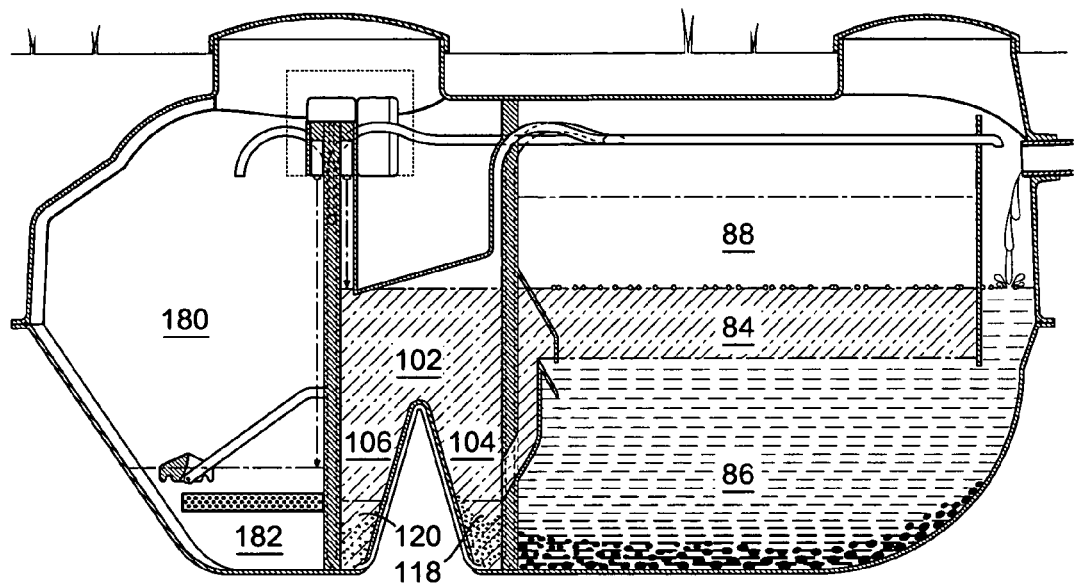
FIGS. 10A-10M are longitudinal cross-sectional elevation views of the wastewater treatment system in FIG. 1 showing exemplary liquid flow through the system.

Located within the receiving chamber 50 are a first operational area 84 at an intermediate elevation within the receiving chamber for receiving the flow of wastewater entering the system, a holding area 88 above the first operational area for accommodating occasional peak-flow demands, and a first solids settling area 86 at the lowermost portion of the receiving chamber for receiving solid material settling out of the wastewater. As the wastewater flows into the receiving chamber 50 of an empty tank 20, the wastewater begins filling the first solids settling area 86. Solid material in the wastewater, will either float to the surface of the wastewater or settle to the first solids settling area 86, depending on the density of the solid material, as illustrated in FIG. 10A. As this separation is occurring, additional wastewater entering the receiving chamber 50 through the inlet opening 30 mixes with the wastewater already in the receiving chamber, preventing the wastewater from becoming stagnant and septic. Some degree of anaerobic biological treatment of organic material contained in the wastewater may naturally take place inside the receiving chamber 50.

Figure 5:
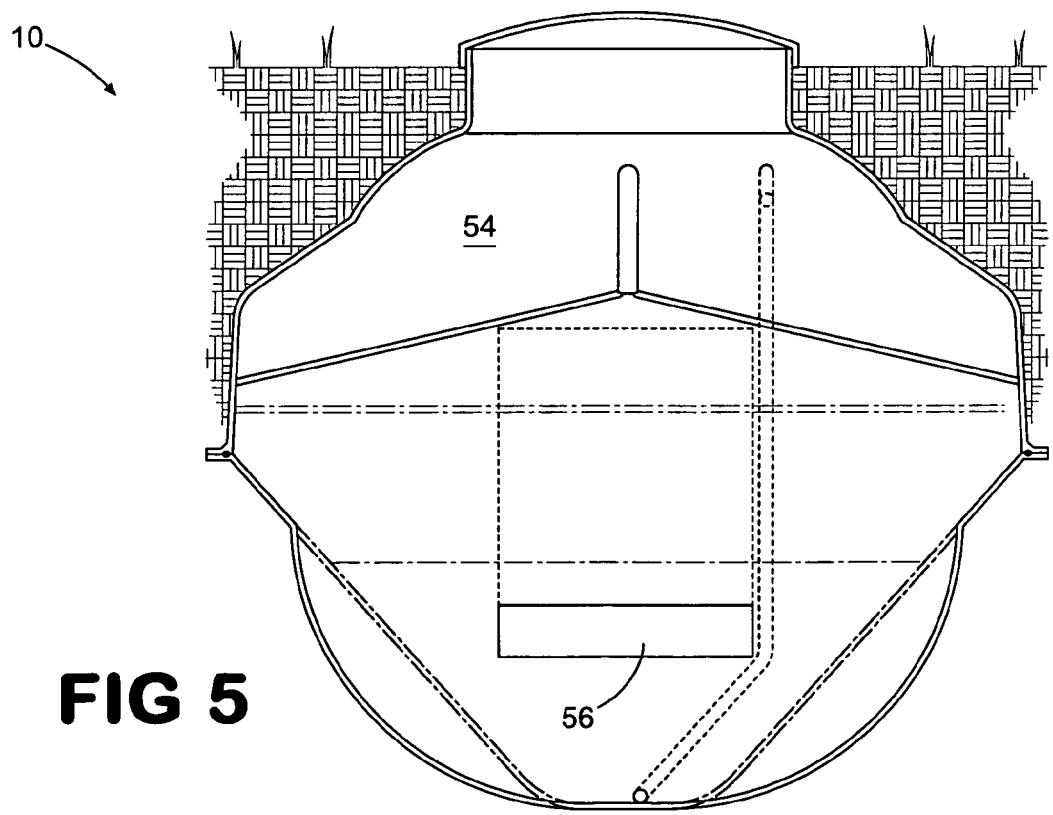
FIG. 5 is a cross-sectional view of the wastewater treatment system taken along lines 5-5 in FIG. 2.

The second side wall 54 of the receiving chamber 50 defines an outlet opening 56 at a level below the first operational area 84, shown in FIGS. 5 and 6, for transferring the wastewater from the first operational area to an equalization chamber 90 at an intermediate location within the tank 20. Positioned around the outlet opening 56 is a filter passage 58 comprising a lower baffle 60 and an upper baffle 70 for inhibiting settleable and floatable solid material in the receiving chamber 50 from flowing over into the equalization chamber 90 with the wastewater and for diverting the wastewater from the first operational area 84 to the outlet open. The lower baffle 60 includes a first inclined wall portion 62 extending upwardly at an acute angle from the second side wall 54 to a distal edge 62a spaced apart from the second side wall, and a vertical wall portion 64 extending upwardly from the distal edge 62a to an upper edge joining a second incline wall portion 66 extending downwardly at an acute angle from the upper edge of the vertical wall portion to a lower edge 66a. The vertical wall portion 64 and the second incline wall portion 66 thus intersect at an apex 68 that defines the interface between the first solids settling area 86 and the first operational area 84 located immediately above the first solids settling area.

The upper baffle 70 includes an incline wall portion 72 extending downwardly at an acute angle from the second side wall 54 to a distal edge 72a, and a vertical portion 74 extending downwardly from the distal edge of the incline wall portion to a lower edge 74a. The lower edge 74a of the vertical wall portion 74 preferably extends below the apex 68 of the lower baffle 60 and is spaced apart from that apex.

The open area 67, between the lower edge 74a of the vertical wall portion 74 for the upper baffle 70 and the second inclined wall portion 66 of the lower baffle 60, thus defines the flow passageway from the first operational area 84 to the outlet opening 56 leading to the equalization chamber 90. The upper baffle 70 ensures that any solid material settling out of wastewater above the upper baffle in the receiving chamber 50 will continue moving downwardly and settle into the first solids settling area 86.

As the wastewater continues to fill the first solids settling area 86, the wastewater begins to enter the open area 67 and contact the second incline wall portion 66 of the lower baffle 60. The second incline wall portion 66 ensures that any solid material settling in that open area 67 is urged downwardly into the first solids settling area 86. Furthermore, floating material that might rise from the first solids settling area 86 is trapped under the second incline wall portion 66 or passes by the open area 67 on ascent to the surface of wastewater rising to the first operational area 84, rather than transferring over to the equalization chamber 90 with the wastewater from the first operational area 84. All floating material in the receiving chamber 50 thus will remain in the first operational area 84 or in the holding area 88, as the water level can never fall below the level of the apex 68, as illustrated in FIGS. 10A-M. Accordingly, the wastewater level in the receiving chamber 50 can go no lower than approximately the lower edge 74a of the vertical portion 74, trapping the floating material in areas 84 and 88. As the wastewater rises above the level defined by the apex 68, the wastewater begins flowing through the open area 67, down the vertical wall portion 64 and the first incline wall portion 62 of the lower baffle 60, and into the equalization chamber 90 through the outlet opening 56 at the lower end of the lower baffle, as indicated by the directional arrows in FIG. 3A.

Figure 3:
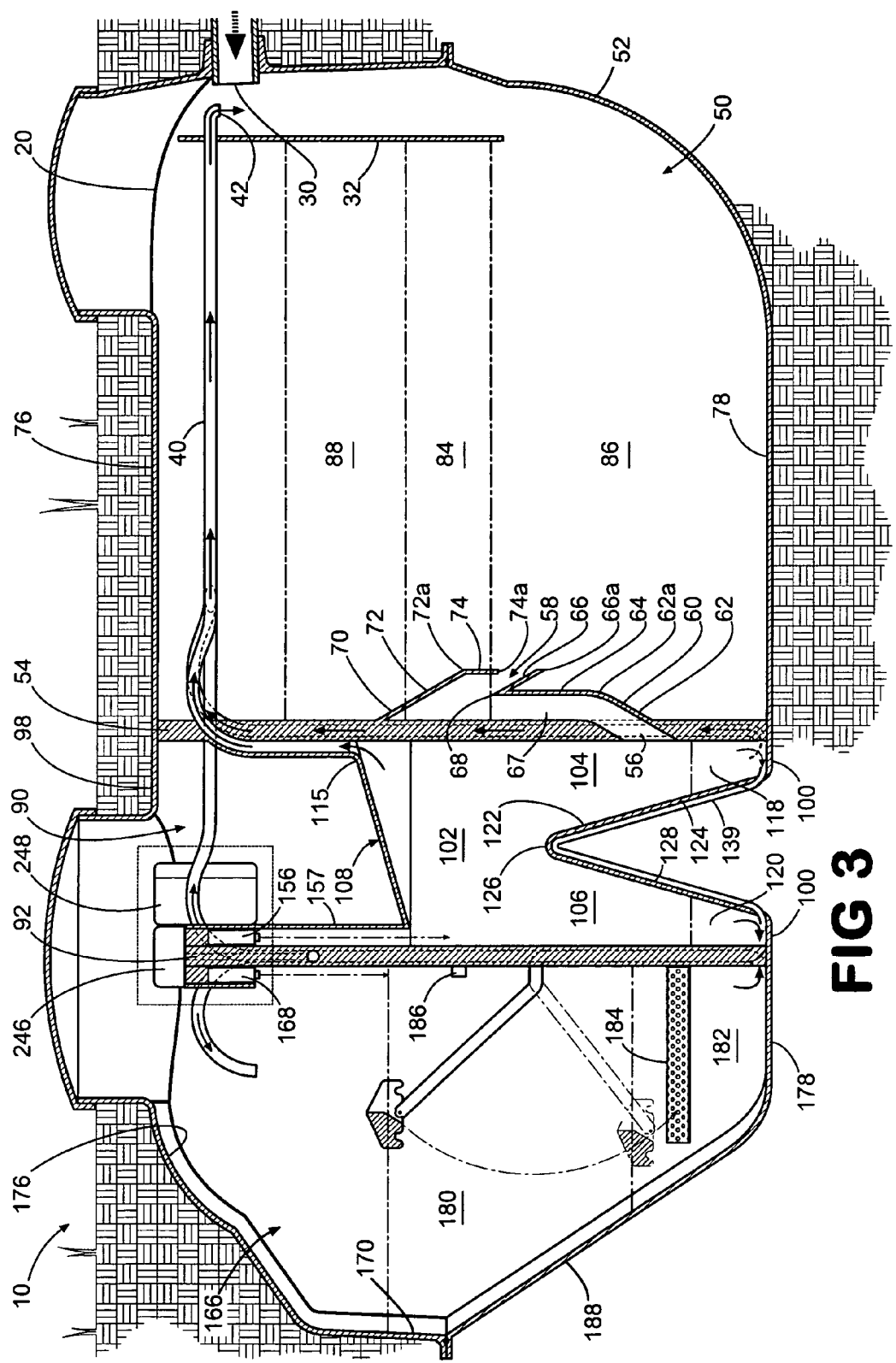
FIG. 3 is a cross-sectional view of the wastewater treatment system taken along lines 3-3 in FIG. 2.

The equalization chamber 90 is separated from the receiving chamber 50 by the second side wall 54 and includes a third side wall 92 opposing the second side wall, a front wall, a rear wall opposing the front wall, a top 98, and a bottom 100 opposing the top. The equalization chamber 90 comprises a second operational area 102 for receiving the flow of wastewater from the first operational area 84 of the receiving chamber 50, and a second solids settling area 118 and a third solids settling areas 120 below the second operational area for receiving any remaining solid material settling out of the wastewater in the equalization chamber. In an embodiment of the present invention, the equalization chamber 90 may also include a funnel assembly 108 located toward the upper end of the equalization chamber for urging any floating solid material at the surface of the wastewater in the equalization chamber to a third airlift pump, as further described below. As the wastewater flows into the equalization chamber 90 and begins filling the second operational area 102, the wastewater contacts a partition 122 dividing a lower portion of the second operational area into a first valley region 104 and a second valley region 106. The partition 122 includes an incline 124 extending from the bottom 100 of the equalization chamber 90 to an apex 126, and a complementary incline 128 extending from the apex to the bottom 100 of the equalization chamber. The first incline portion 62 of the lower baffle 60 and the incline 124 of the equalization chamber 90 cause solid material settling out of the wastewater in the second operational area 102 to move towards the second solids settling area 118 located at the bottom of the first valley region 104, as illustrated in FIGS. 3 and 10A.

Figure 10B:
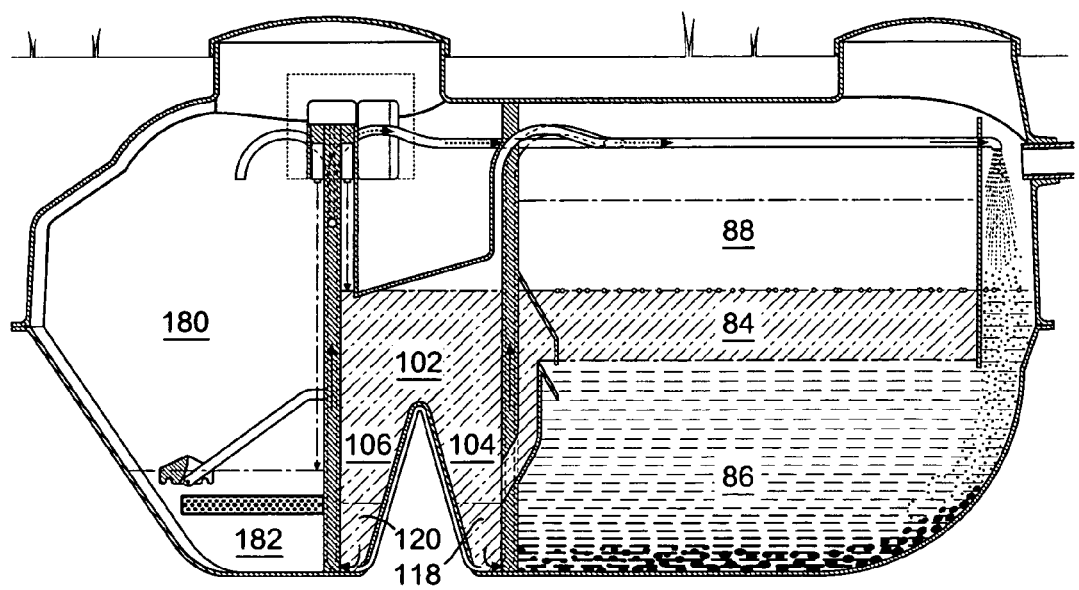
Figure 11:
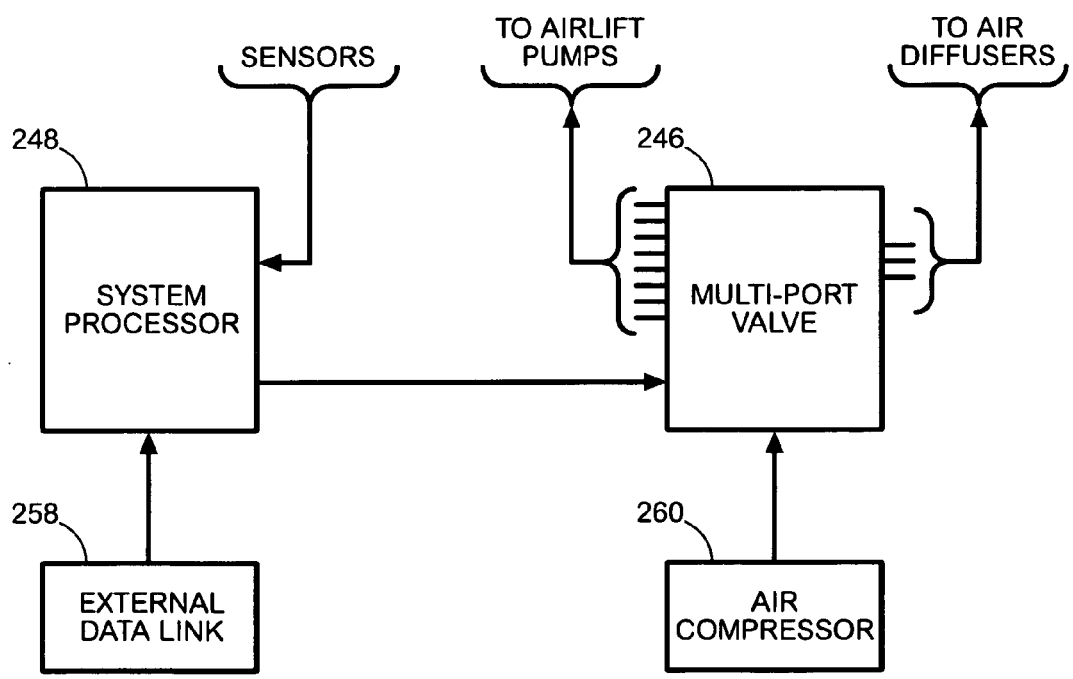
FIG. 11 is a block diagram showing the association between a system processor, a multi-port valve, an air compressor, sensors, airlift pumps, and air diffusers for the present invention.

The solid material settling in the second solids settling area 118 may periodically be removed to the receiving chamber 50 by a first airlift pump comprising a pipe 130 (FIG. 6) connected to a common trunk line 40 located above the first and second operational areas and extending from the equalization chamber 90 to the receiving chamber. This second solids settling area 118 is sized relative to the low-to-medium head pressure strength of the airlift to ensure that all the solids will be removed from this area. The basic design and operation of airlift pumps are known to those skilled in the art and need not be repeated herein. The pipe 130 preferably comprises an inlet end 132 located in the second solids settling area 118, which allows solid material that has accumulated in the second solids settling area to enter the pipe, and an outlet end 134 connected to the common trunk line 40, which allows the solid material to be received by the common trunk line. When air is supplied to an air intake opening 136 of the pipe 130, the solid material is moved by the first airlift pump through the pipe and the common trunk line 40 and is discharged into the receiving chamber 50 through an outlet end 42 of the common trunk line located adjacent the baffle 32, as illustrated in FIG. 10B. The transferred solid material will settle into the first solids settling area 86 and remain in that area until broken down and anaerobically digested. Returning the solid material from the equalization chamber 90 to the receiving chamber 50 also causes mixing and displacement of fluids in the receiving chamber, which helps prevent scabbing that may otherwise occur on the surface of the wastewater in the receiving chamber. Furthermore, the suction caused by the first airlift pump creates a downward drag urging any solid material that may be remaining in the first valley region 104 downwardly into the second solids settling area 118. The transfer of the solid material via the first airlift pump from the equalization chamber 90 to the receiving chamber 50 is driven by air supplied from an air source such as an air compressor 260 (FIG. 11), as discussed below.

As wastewater continues to flow into the tank 20, the wastewater in the equalization chamber 90, flows over the apex 126, and into the second valley region 106 of the second operational area 102. The complementary incline 128 and the third side wall 92 of the equalization chamber 90 form the second valley region 106. Any solid material that may remain in the wastewater within the equalization chamber 90 will tend to move downwardly to the third solids settling area 120 located below the second valley region 106. Solid material accumulating in the third solids settling area 120 may be returned to the receiving chamber 50 via airlift through a second airlift pump (FIG. 6) comprising a pipe 138, which extends upwardly and connects to the common trunk line 40. This solids area 120 is also sized to the low-to-medium head pressure strength of the airlift 138. The pipe 138 preferably comprises an inlet end 140 located in the third solids settling area 120 for allowing solid material that has accumulated in the third solids settling area to enter the pipe, and an outlet end 142 connected to the common trunk line 40. When air is supplied through the air intake opening 144 of the pipe 138, the solid material is moved through the pipe and the common trunk line 40 and is discharged into the receiving chamber 50 through the open end 42 of the common trunk line, as illustrated in FIG. 10B. Solid material accumulating in the second and third solids settling areas 118, 120 is preferably transferred to the receiving chamber 50 when the level of the wastewater in the equalization chamber 60 is high in order to provide maximum transfer rate of the solid material via the first and second airlift pumps.

As wastewater continues to flow into the system 10, the wastewater in the second valley region 106 rises until it surpasses the level of the apex 126. After the wastewater in the equalization chamber 90 surpasses the level of the apex 68 of the lower baffle 60 in the receiving chamber 50, the level of wastewater in the equalization chamber and receiving chamber will rise together. At this level, the wastewater in the receiving chamber 50 fills the first operational area 84 and contacts the upper baffle 70 located above and spaced apart from the lower baffle 60, as shown by FIG. 10A. As previously mentioned, the upper baffle 70 ensures that any solid material settling out of the wastewater in the first operational area 84 and the holding area 88 will continue moving downwardly and settle in the first solids settling area 86 instead of flowing into the equalization chamber 90.

When the wastewater reaches the top level of the first operational area 84 of the receiving chamber 50, the wastewater in the equalization chamber 90 contacts the funnel assembly 108 having a first triangular-shaped baffle 109 extending upwardly at an acute angle from the front wall of the equalization chamber to an upper point located adjacent the second side wall 54, a second triangular-shaped baffle 111 extending upwardly at an acute angle from the rear wall of the equalization chamber to an upper point located adjacent the second side wall, and a third triangular-shaped baffle 113 extending upwardly at an acute angle from the third side wall 92 to an upper point joining the first and second triangular-shaped baffles, as best illustrated in FIG. 6. The first triangular-shaped baffle 109, second triangular-shaped baffle 111, and third triangular-shaped baffle 113 thus intersect at an apex 115 (FIG. 3) such that as the level of the wastewater in the equalization chamber 90 rises to completely contact the funnel assembly 108, any solid material floating on the surface of the wastewater will be urged to the apex and transferred to the receiving chamber 50 via the third airlift pump. The third airlift pump comprises a pipe 148 having an inlet end 150 located at or just below the apex 115 of the funnel assembly 108 for receiving the floatable solid material in the pipe, and an outlet end 152 connected to the common trunk line 40, as shown in FIGS. 3 and 6. When air is supplied through an air intake opening 154 of the pipe 148, the solid material is moved through the pipe and the common trunk line 40 and is discharged into the receiving chamber 50 through the outlet end 42 of the common trunk line, as illustrated in FIGS. 10I-J.

To aerobically treat the wastewater, batches of the wastewater are transferred from the second operational area 102 of the equalization chamber 90 to a reaction chamber 166. As illustrated in FIG. 3, the reaction chamber 166 is separated from the equalization chamber 90 by the third side wall 92 and comprises a fourth side wall 170 opposing the third side wall, a front wall, a rear wall opposing the front wall, a top 176, and a bottom 178 opposing the top. The reaction chamber 166 preferably includes a third operational area 180 for receiving the batch of wastewater transferred from the equalization chamber 90, and an activated sludge area 182 below the third operational area for receiving a population of microorganisms. Wastewater transferred from the equalization chamber 90 to the third operational area 180 mixes with the population of microorganisms in the activated sludge area 182. The population of microorganisms is capable of consuming the organic material remaining in the wastewater.

The activated sludge area 182 is preferably sized to hold a population of microorganisms sufficient to biologically process the largest batch of wastewater the treatment system 10 is designed to process within a 24-hour period. Thus, the reaction chamber 166, in a preferred embodiment of the present invention, is sized so that the third operational area 180 can hold and biologically treat the largest volume of wastewater anticipated in a predetermined interval within a 24-hour period. Assuming the entire contents of the equalization chamber 90 must be transferred to the third operational area 180 at the start of each such interval, the volume of the third operational area 180 thus should be approximately the same as the combined volumes of the second operational area 102 (including the first and second valley regions 104, 106), the second and third solids settling areas 118, 120, and the open space 67, which in turn should be approximately equal in volume to the first operational area 84 in the receiving chamber 50. For example, an expected maximum daily inflow rate is 500 gals., allowing a safety factor of 250 gals. in the holding area 88 for hydraulic surges, would yield a maximum design inflow rate of 750 gals./day. It can be shown that the longest period of time to process and transfer a batch of wastewater in the reaction chamber 166 is one hour for anoxic treatment, 4.5 hours of aerobic treatment by aeration, followed by 1.5 hours for clarification and one hour to transfer the clarified liquid from the reaction chamber. Accordingly, eight hours of processing time is required for each batch of wastewater transferred into the reaction chamber. Therefore, if the maximum daily expected inflow is 750 gals. for a particular embodiment, to accommodate three eight-hour batches the volume of the third operational area should be 250 gals. In turn, the volume of the second operational area 102 (including the first and second valley regions 104,106), the second and third solids settling areas 118, 120, and the open space 67 should be 250 gals. Thus, the volume of the first operational area 84 should also be 250 gals. to replace the wastewater periodically transferred from the equalization chamber to the reaction chamber, and the volume of the holding area 88 will also be 250 gals with the present example. It should be understood that the capacities in the foregoing example may be scaled up or down to treat different maximum volumes of wastewater anticipated over predetermined periods of time.

It will be understood that the rate of wastewater inflow to a localized wastewater treatment system according to the present invention will likely vary from maximum to zero over a typical 24-hour period, and at times will be much less than the maximum volume for which a particular system is designed. Moreover, the makeup of that inflow may vary from rich in dissolved organic material, to very little organic material, to no organic material at all. The localized wastewater treatment system 10, according to certain embodiments of the invention, thus may transfer wastewater from the equalization chamber 90 to the reaction chamber 166 according to the amount of time the wastewater has spent in the equalization chamber 90 or according to the volume of the wastewater in the equalization chamber. For example, the localized treatment system 10, over time, may determine that, for that particular residence or business, 120 gals. of wastewater need to be processed every eight hours. Thus, batches of wastewater will typically be transferred to the reaction chamber 166 based on whether the wastewater has been held in the equalization chamber 90 for the predetermined amount of time, eight hours in the present. If, however, in a given eight-hour period only a lesser amount, e.g., 75 gals., of wastewater has collected in the equalization chamber 90, the treatment system will preferably opt to transfer the entire 75 gals. to the reaction chamber 166 and process a smaller-than-normal batch to maintain a routine processing schedule. If, on the other hand, a greater-than-normal amount, e.g., 200 gals., of wastewater accumulates in the equalization chamber 90 in just a four-hour period, the treatment system may preferably determine to shorten the treatment of the previous batch and transfer the 200 gals. to the reaction chamber 166 and process the larger-than-normal batch because when the wastewater reaches a predetermined volume, the system decides to process the wastewater instead of waiting for the predetermined amount of time to expire. Therefore, the localized wastewater treatment system, according to certain embodiments of the present invention, is capable of changing the way the system processes wastewater to accommodate the variations in the flow of wastewater from a residence or business.

The system of the present invention continually monitors the volume of wastewater accumulating in the equalization chamber 90. A first ultrasonic sensor 156, preferably located near the top of the equalization chamber 90, monitors the volume of the wastewater in the equalization chamber by emitting and receiving sound waves through a stilling tube 157 extending through an opening in the third triangular-shaped baffle 113 of the funnel assembly 108. Once emitted from the first ultrasonic sensor 156, the sound waves reflect off the surface of the wastewater in the equalization chamber 90 and are received back by the first ultrasonic sensor. The time that elapses between sending and receiving the sound wave is used by the system processor 248 to determine the level of the wastewater in the equalization chamber 90, and that level is a function of the volume of the wastewater in the chamber. Because the shape of each chamber in the tank 20 of the disclosed embodiment is irregular, the relation between the liquid level in each predetermined vertical fraction measured by the sensor 156 and the volume of liquid corresponding to that measured vertical fraction is initially determined by measuring the actual volume of liquid in each vertical fraction within that chamber. Those fractional volumes are stored as a lookup table in a system processor 248 (FIG. 11), described below, from which the system determines the volume of liquid in the equalization chamber 90 corresponding to any vertical height measured by the ultrasonic sensor 156.

Figure 10C:
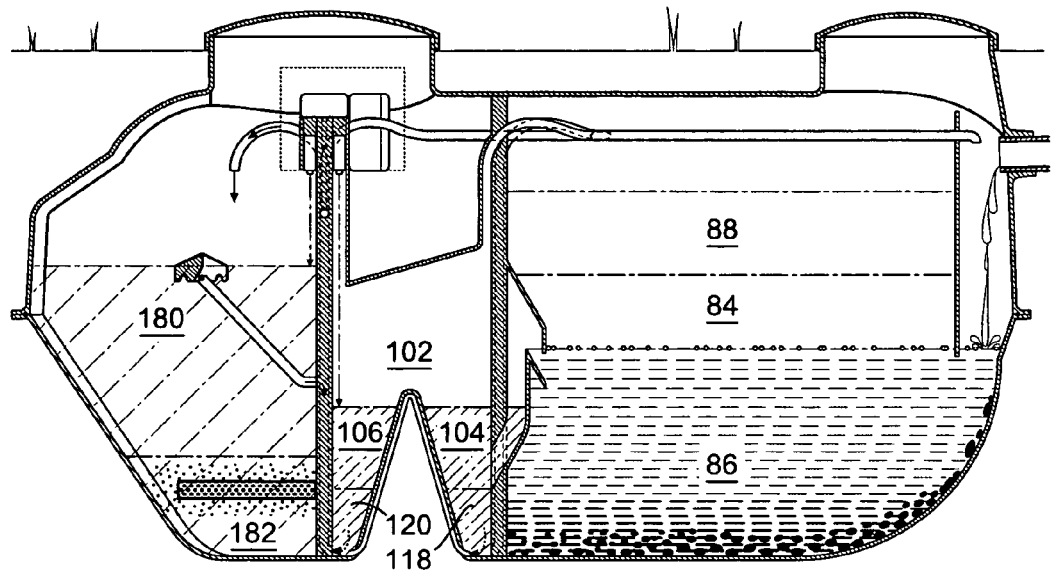

As illustrated in FIGS. 10B-C, once the wastewater in the equalization chamber 90 either is held in the equalization chamber for a predetermined amount of time or reaches a predetermined volume, a batch of the wastewater is transferred from the equalization chamber to the reaction chamber 166 by a fourth airlift pump comprising a pipe 158 having an inlet end 160 located in the second valley region 106 for receiving the wastewater into the pipe, and having an outlet end 162 located near the top of the reaction chamber for discharging the batch of wastewater into the reaction chamber, as illustrated in FIG. 6. In an embodiment of the present invention, the upper end of pipe 158 is curved to locate the outlet end 162 above and directed downwardly toward the maximum intended level of liquid in the reaction chamber 166, so that the wastewater from the second operational area 102 is discharged above the upper surface of the wastewater accumulating in the reaction chamber. When air is supplied through an air intake opening 164 of the pipe 158, the wastewater is moved through the pipe and is discharged into the reaction chamber 166 through the outlet end 162, as shown in FIG. 10C. As the wastewater in the second operational area 102 is transferred to the reaction chamber 166, the wastewater level in the equalization chamber 90 begins to fall, and any wastewater in the first operational area 84 of the receiving chamber 50 flows into the second operational area of the equalization chamber, as illustrated in FIGS. 10C-G. Once the wastewater level in the equalization chamber 90 falls below the apex 126, if no wastewater has accumulated in the first operational area 84, approximately all of the wastewater in the first valley region 104, the second solids settling area 118, and the open space 67 can be transferred to the second valley region 106 by a siphon conduit 139, as shown in FIG. 3. The siphon conduit 139 includes an inlet end located near the bottom of the second solids settling area 118 for receiving the wastewater in the second solids settling area, an outlet end located near the bottom of the third solids settling area 120, and an intermediate point located at a level above the inlet and outlet ends of the siphon conduit. As the wastewater level in the equalization chamber 90 falls below the intermediate point of the siphon conduit 139, the wastewater in the second solids settling area 118 is transferred through the siphon conduit and is discharged into the third solids settling area 120 through the outlet end of the siphon conduit, thereby maintaining the level of liquid in the first valley region 104 substantially the same as in the second valley region 106.

The system, through a second ultrasonic sensor 168 preferably located near the top of the reaction chamber 166, monitors the volume of wastewater transferred to the reaction chamber from the equalization chamber 90. The second ultrasonic sensor 168 emits and receives sound waves similar to the first ultrasonic sensor 156 described above, to determine the volume of the wastewater in the reaction chamber 166 as a function of the measured vertical height of liquid in the reaction chamber. Once the volume of wastewater in the reaction chamber 166 reaches the volume the system determined to transfer from the equalization chamber 90 to the reaction chamber 166, the transfer of the wastewater is stopped. Since the transfer rate of the wastewater by the fourth airlift pump is determinable, the system can establish if the sensors 156, 168 are working properly based on the volume of the wastewater determined by the sensors and the transfer rate of the fourth airlift pump. If the sensors 156, 168 are determined not to be working properly, then an alarm may be signaled indicating that one of the sensors has malfunctioned. Such an alarm may be beneficial to avoid transferring an undesirable volume of wastewater from the equalization chamber 90 to the reaction chamber 166 without any notification. The sensors 156, 168 allow the system to control changes in the flow of wastewater without the need for manual on-site adjustments.

As the transfer of wastewater into the reaction chamber 166 takes place, the wastewater mixes with the microbe biomass (activated sludge) remaining in the activated sludge area 182 from treatment of the previous batch, as illustrated in FIG. 10C. Those microbes, having just been through clarification for, e.g., 1.5 hours followed by approximately one hour for transfer from the reaction chamber, are now oxygen-starved. Accordingly, as the batch of wastewater is transferred into the reaction chamber 166, the microbes in the activated sludge area 182 of the reaction chamber initially mix with the incoming wastewater and biologically remove nutrients from the wastewater through a process known as denitrification due to the introduction of a carbon source, namely, the new batch of wastewater, and the lack of dissolved oxygen available in the reaction chamber after processing a previous batch of wastewater. For a predetermined amount of time after the batch of wastewater is transferred into the reaction chamber 166, the wastewater undergoes an anoxic period during which certain nutrients are removed from the wastewater.

Figure 10D:
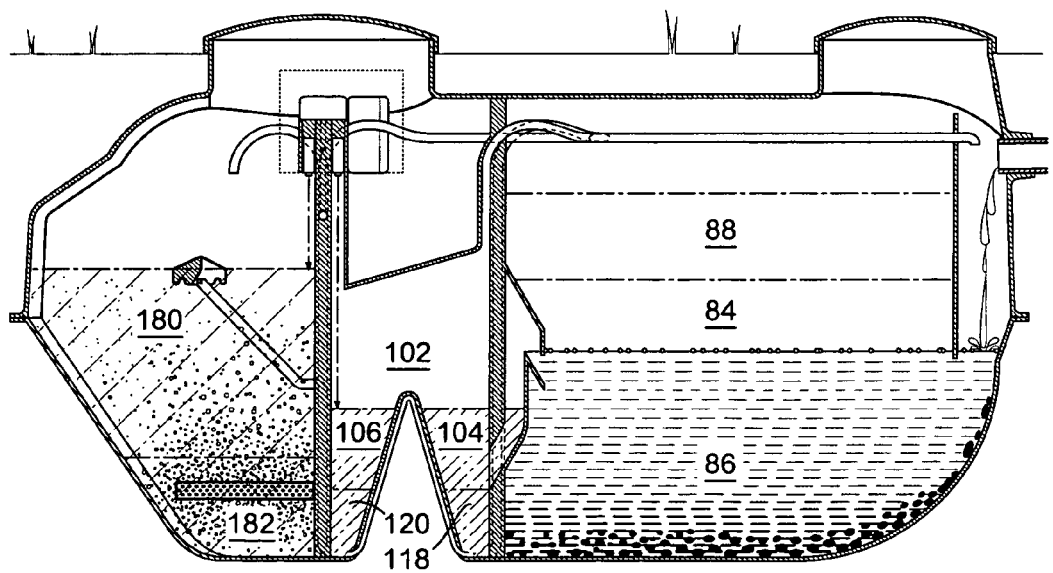

At the conclusion of a predetermined anoxic period, the batch of wastewater is aerated for a predetermined amount of time. To aerate the wastewater in the reaction chamber 166, at least one air diffuser 184 is situated near the bottom of the reaction chamber 166. The air diffuser 184 is connected to a source of air, such as an air compressor, and produces streams of relatively fine air bubbles rising from the bottom of the third operational area 180, mixing the population of microorganisms in the activated sludge area 182 with the batch of wastewater, as illustrated in FIG. 10D. The introduction of air to the reaction chamber 166 causes the population of microorganisms to multiply and consume the organic material remaining in the wastewater. The aeration continues for a period of time determined by the system 10 based on the population of microorganisms in the reaction chamber 166 and the volume of the batch of wastewater. At the end of the aeration period, the air to the diffuser 184 is turned off. Immediately after the air is turned off, the density of the wastewater in the reaction chamber 166 may be measured using a density sensor 186 located within the third operational area 180. The density sensor 186 emits and receives back a signal. Based on the elapsed time between the emission and receipt of the signal, the system processor determines the amount, or population, of microorganisms present in the reaction chamber 166. The system processor stores this value to use when determining the amount of aeration time needed to process the following batch of wastewater.

Figure 10E:
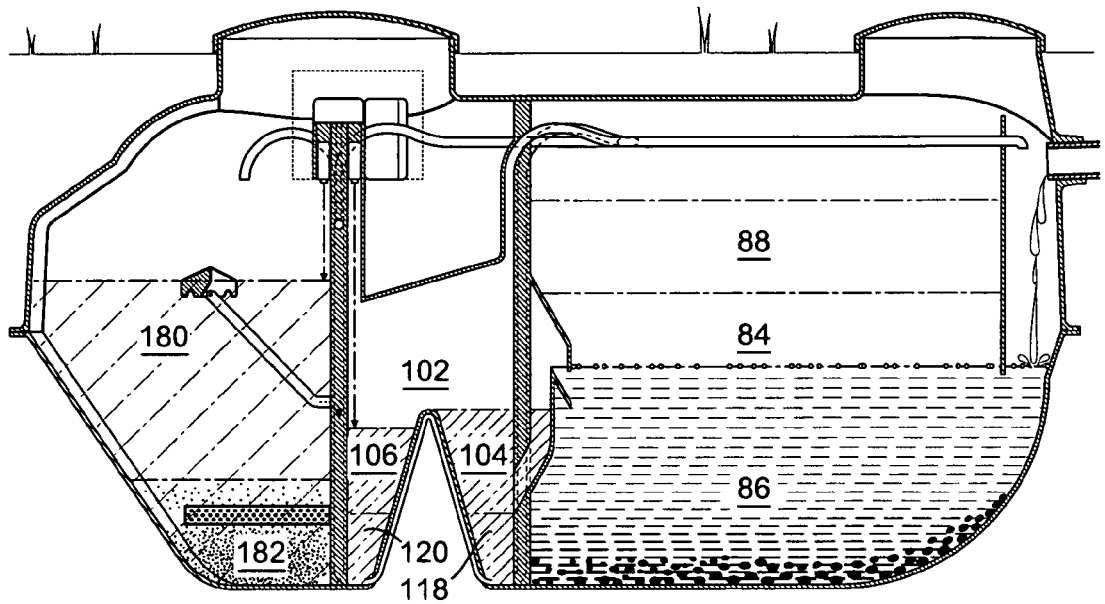
Figure 10F:
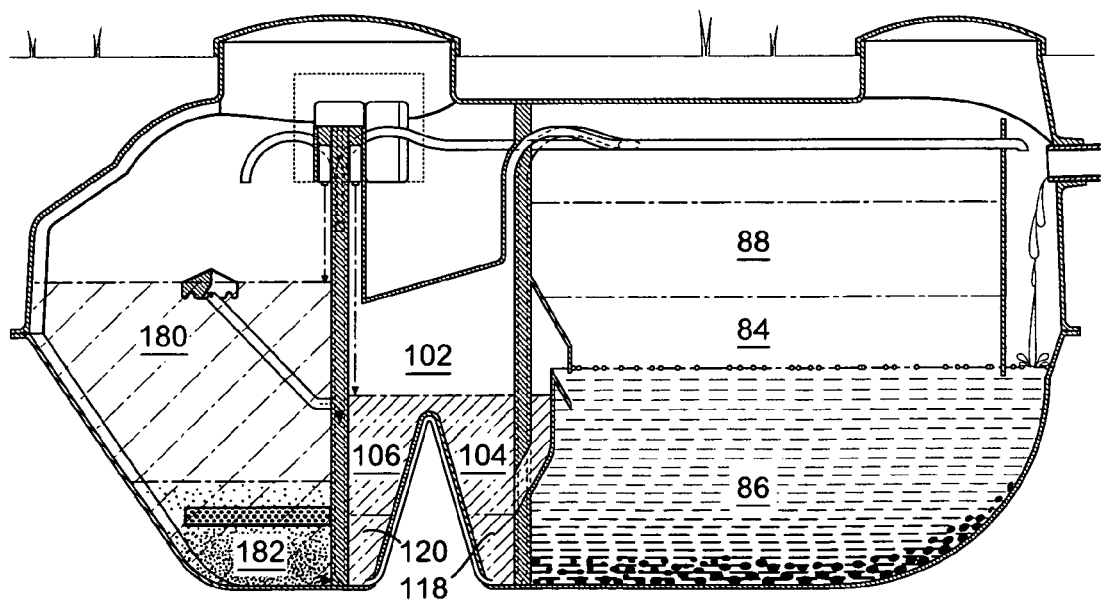
Figure 10G:
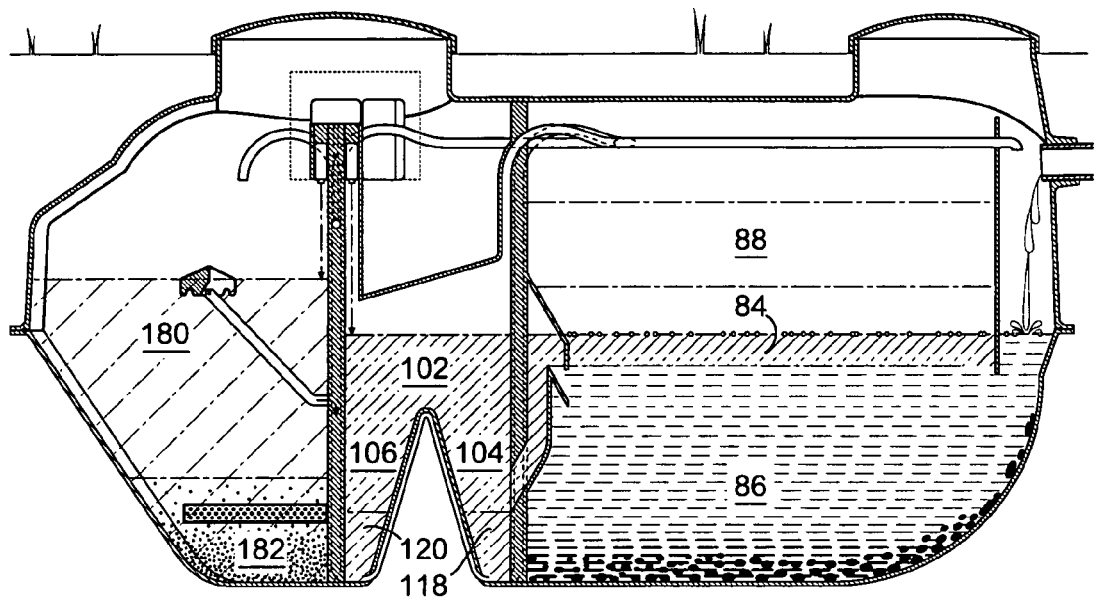

After aeration is turned off in the reaction chamber 166, the wastewater undergoes a clarification phase for a predetermined amount of time. During the clarification phase, the microorganisms in the wastewater of the reaction chamber 166 settle down to the activated sludge area 182 of the reaction chamber, leaving a layer of treated wastewater above the activated sludge area, as illustrated in FIGS. 10E-G. It should be understood that the time required for the microorganisms to settle out of the wastewater is dependent on the volume of the batch of wastewater and the velocity at which the microorganisms settle out of the wastewater. As the settling occurs, the microorganisms encounter an incline 188 (FIG. 3) connecting the fourth side wall 170 of the reaction chamber 166 to the bottom 178. The incline 188 urges the microorganisms to move towards the activated sludge area 182 at the bottom of the reaction chamber 166.

As best shown in FIGS. 10C-G, while a batch of wastewater is undergoing aeration and clarification in the reaction chamber 166, wastewater continues to flow into the receiving and equalization chambers 50, 90. However, once a batch of wastewater is completely transferred to the reaction chamber 166, no wastewater is added to that batch of wastewater so that the batch is processed without interruption from an additional flow of wastewater into the reaction chamber 166.

Figure 2:
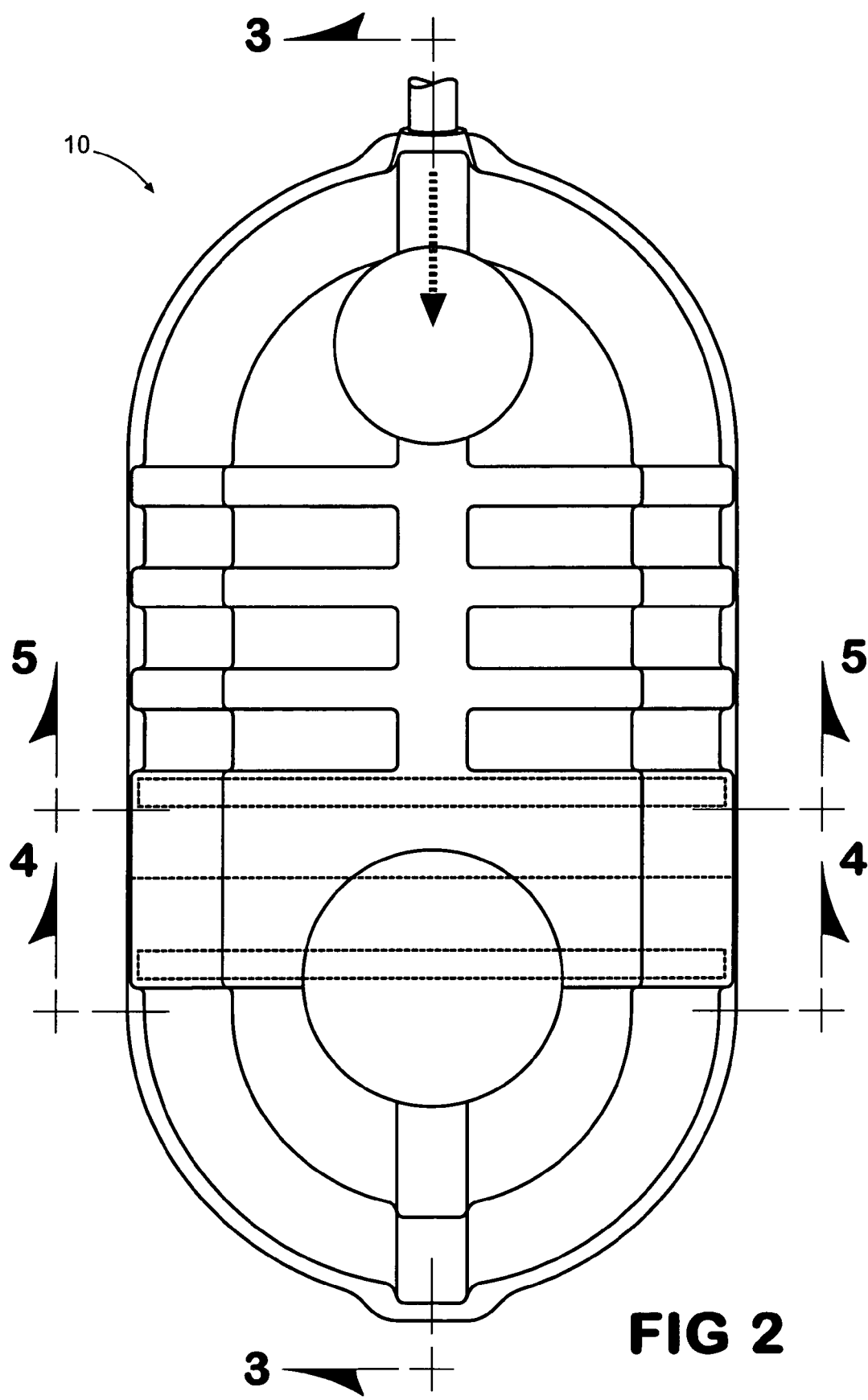
FIG. 2 is a top plan view of the wastewater treatment system shown in FIG. 1.
Figure 3A:
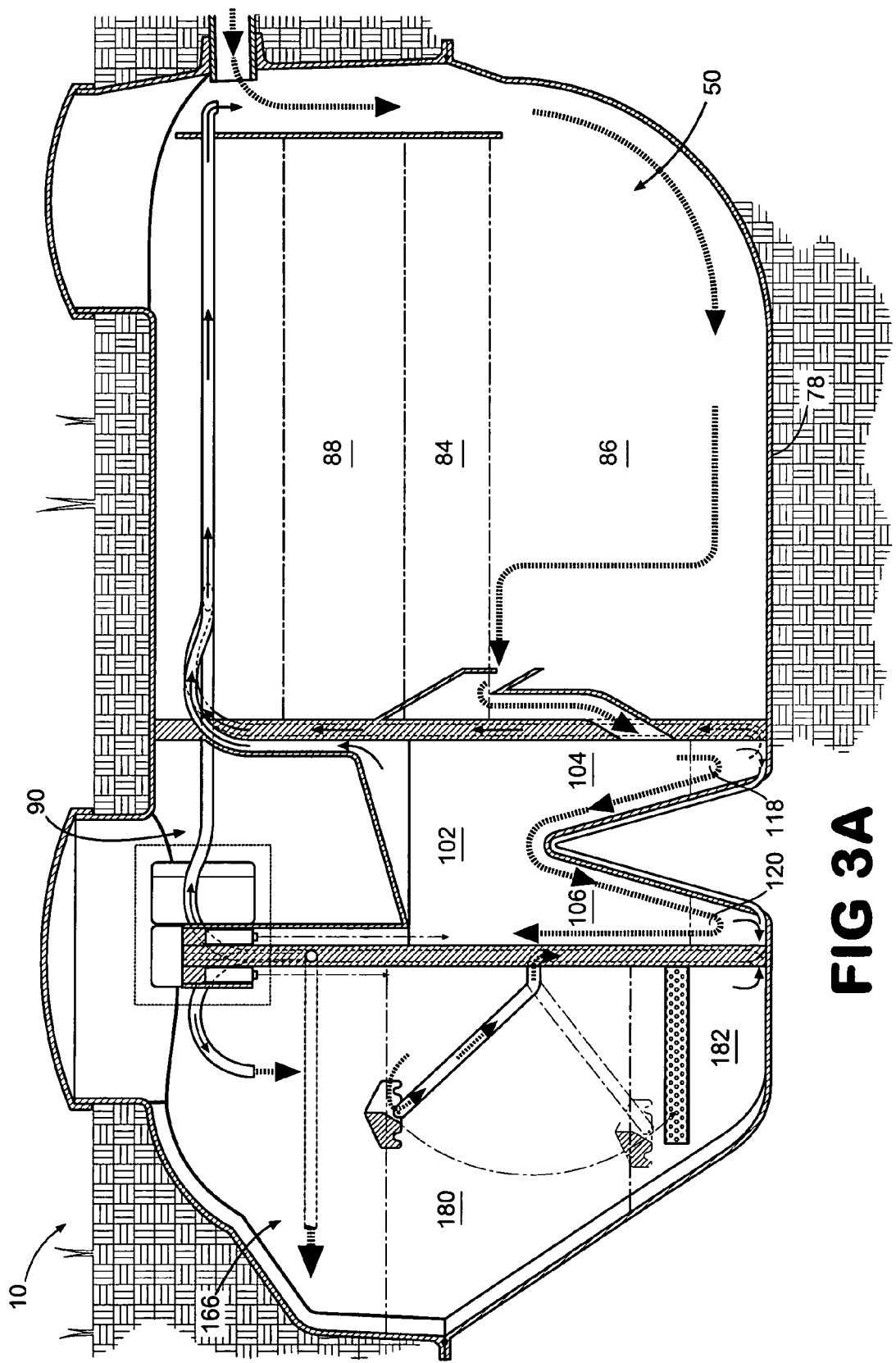
FIG. 3A is a cross-sectional view of the wastewater treatment system as in FIG. 3 with arrows showing exemplary liquid flow throughout the system.
Figure 4:
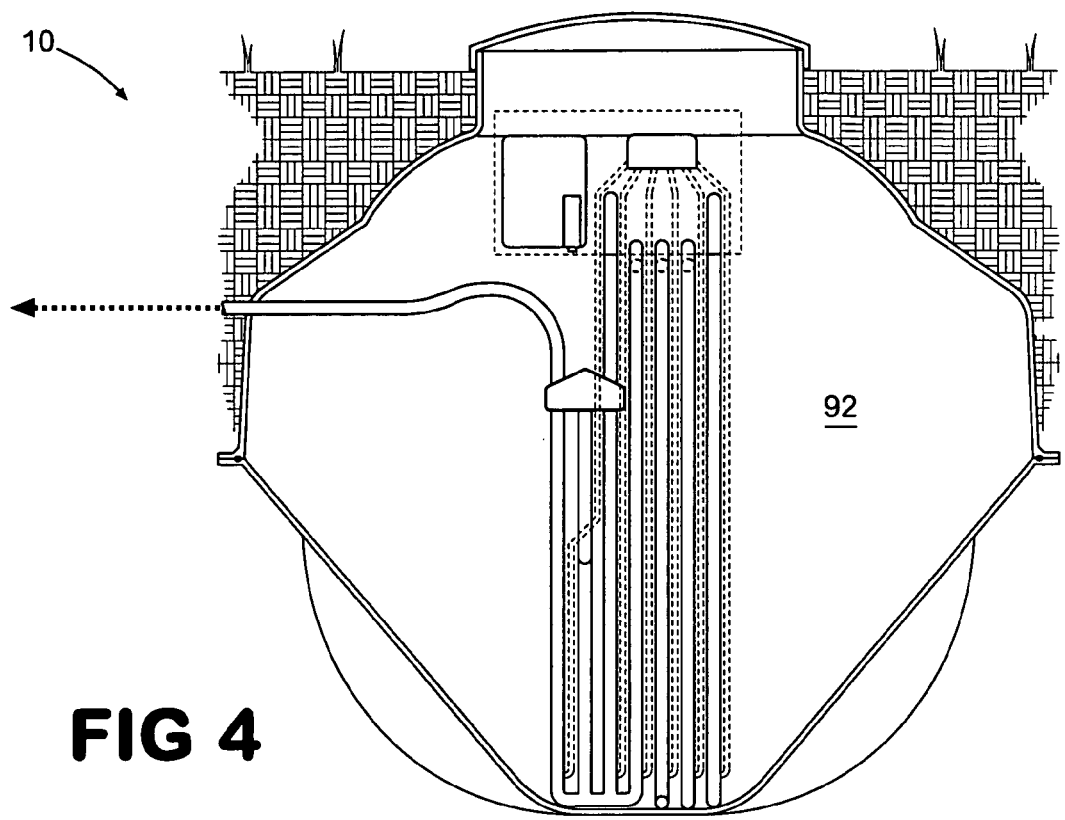
FIG. 4 is a cross-sectional view of the wastewater treatment system taken along lines 4-4 in FIG. 2.
Figure 10H:
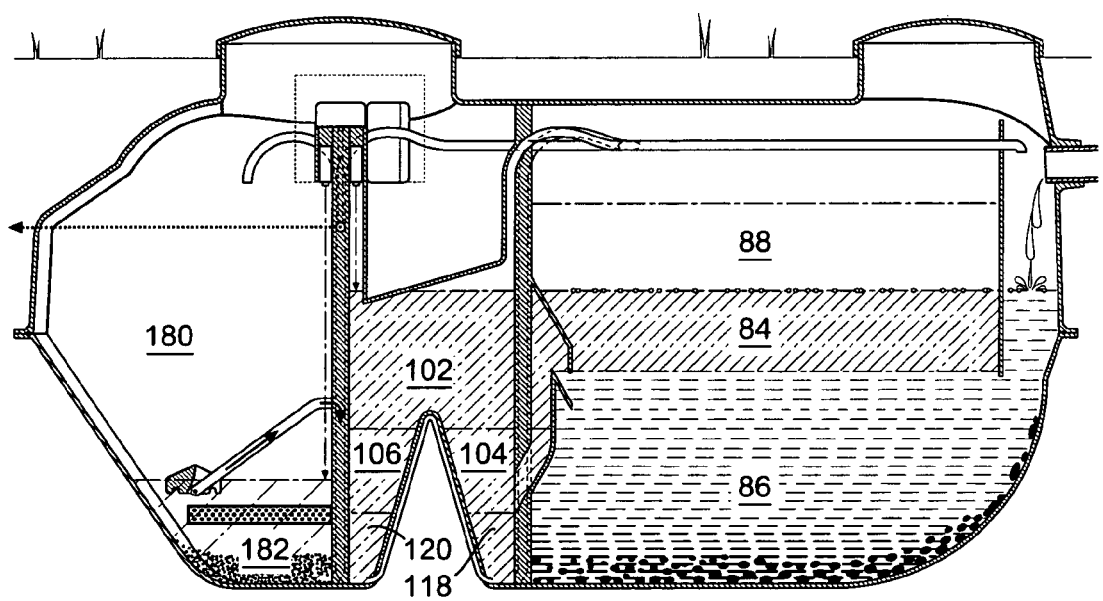
Figure 10I:
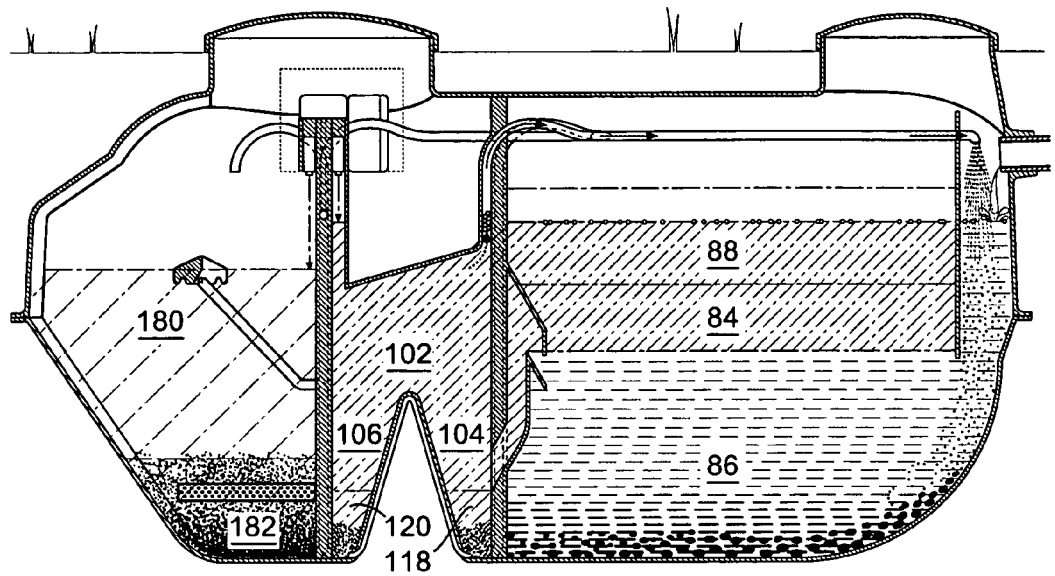
Figure 10J:
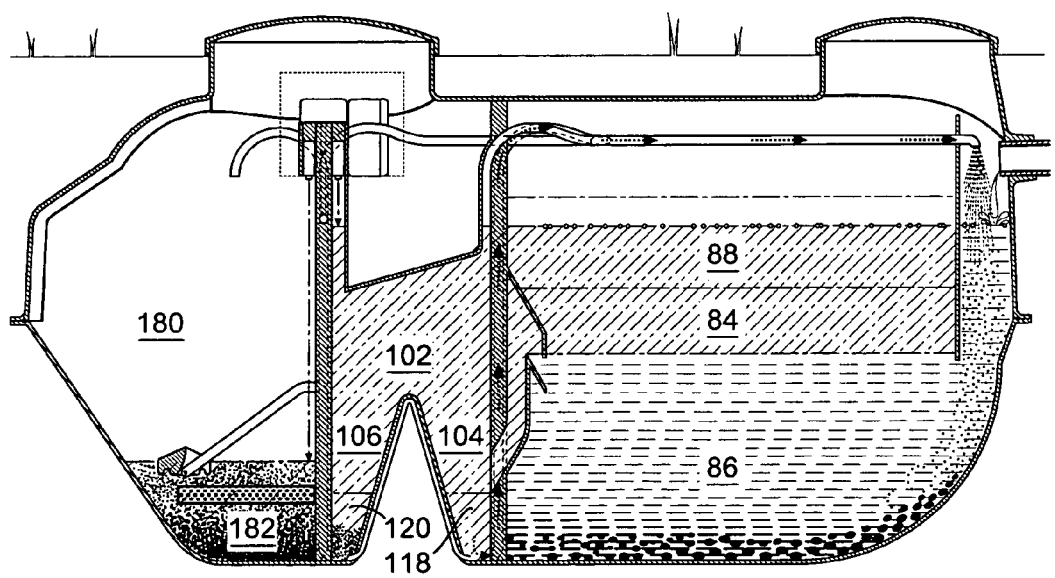
Figure 10K:
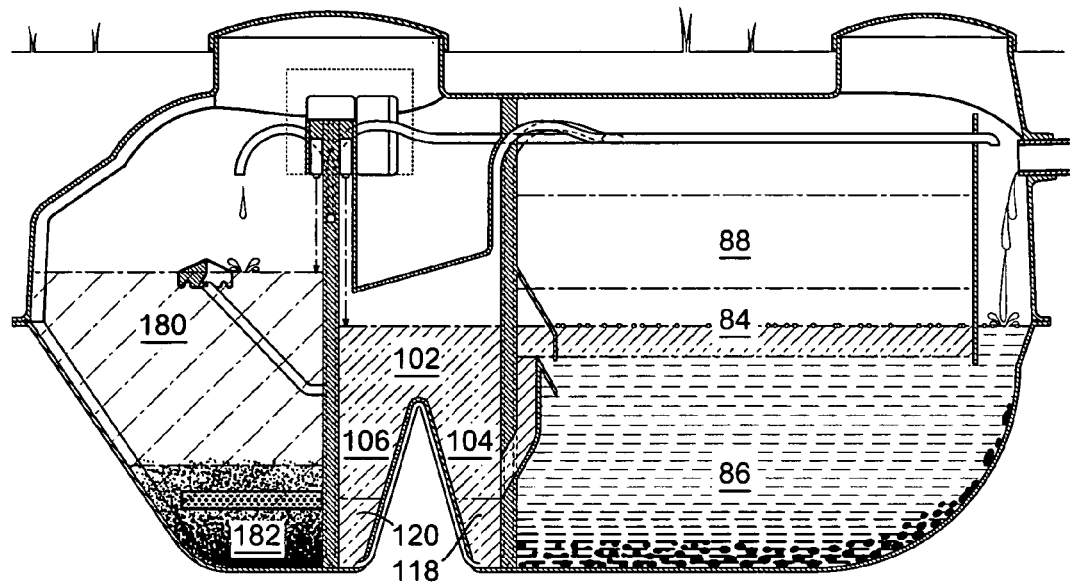
Figure 10L:
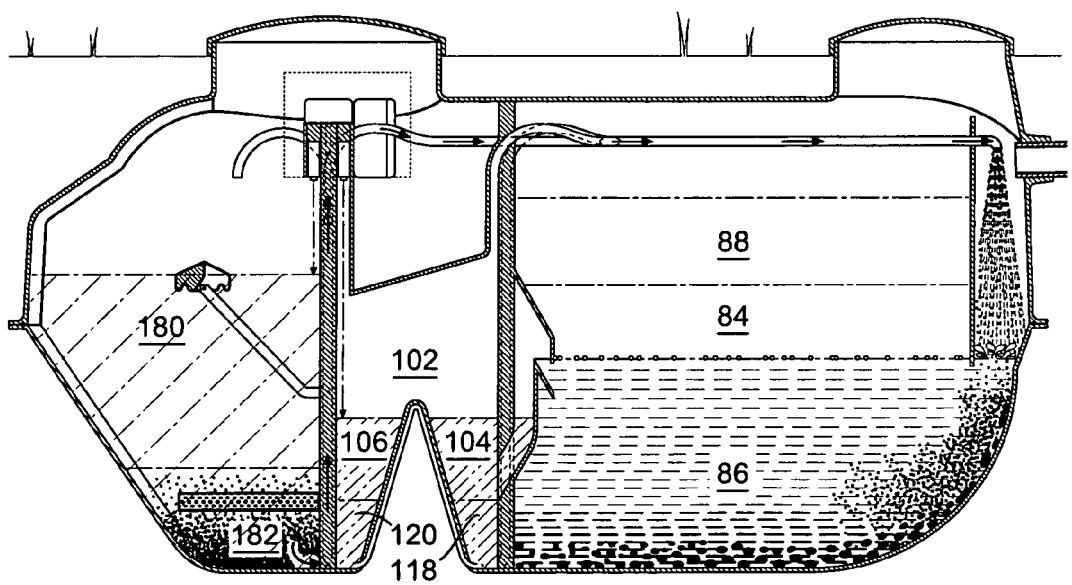

At the end of the clarification phase, a portion of the population of microorganisms that have settled to the activated sludge area 182 may be wasted, or transferred from the reaction chamber 166 to the receiving chamber 50 to control the quantity of microorganisms in the reaction chamber as well as the amount of time the microorganisms remain in the reaction chamber, as illustrated in FIG. 10L. The microorganisms are preferably transferred by a fifth airlift pump shown in FIG. 6 comprising a pipe 190 having an inlet end 192 in the activated sludge area 182 for receiving the microorganisms in the pipe, and an outlet end 194 connected to the common trunk line 40, as illustrated in FIG. 2. When air is supplied through an air intake opening 196 of the pipe 190, the microorganisms are moved through the pipe and the common trunk line 40 and are discharged into the receiving chamber 50 through the outlet end 42 of the common trunk line. The microorganisms are preferably transferred from the reaction chamber 166 to the receiving chamber 50 prior to transferring the batch of wastewater from the reaction chamber in order to provide maximum transfer rate of the microorganisms via the fifth airlift pump.

The microorganisms discharged to the receiving chamber 50 eventually settle to the first solids settling area 86. The wasting of microorganisms from the reaction chamber 166 to the receiving chamber 50 prevents filamentous microorganisms from forming in the reaction chamber due to aging of the microorganisms. The aged microorganisms that are transferred to the receiving chamber 50 will attach themselves to organic matter in the receiving chamber, consuming the air as well as the food. Because there is no external airflow into the receiving chamber 50 other than the oxygen in the incoming wastewater, the wasted microorganisms will soon die due to the lack of dissolved oxygen in the receiving chamber.

At the conclusion of the clarification phase, an upper layer of the liquid in the reaction chamber 166 is now substantially clear and devoid of foreign matter, as shown in FIG. 10G. This treated wastewater, or supernatant, in the reaction chamber 166 may be discharged from the reaction chamber to any suitable destination such as a conventional drain field, as described below. Because the population of microorganisms has been allowed to settle to the activated sludge area 182 located below the third operational area 180, the supernatant is preferably removed from just below the surface of the treated wastewater and not from the surface itself, where there might be some remaining floating material. Moreover, as the liquid level drops in the reaction chamber 166, there may be microbes left on the walls that fall onto the surface of the liquid. However, those microbes will remain on the surface due to the surface tension of that liquid and the absence of disturbance at the surface and thus will not be withdrawn with the liquid being removed from just below the surface.

Because it is desirable to remove the treated wastewater from just below the surface, a float assembly 198 is employed as best seen in FIGS. 6-6A. The float assembly 198 preferably comprises a buoyant member 200 and a conduit 206 having an inlet end 208 attached to the buoyant member by a pin 201 and an outlet end 210 (FIG. 6) connected to a pipe 214 having an inlet end 216 and an outlet end 218, as further explained below. The buoyant member 200 includes a U-shaped notch 203 which allows liquid from just below the surface of the treated wastewater to enter the inlet end 208 of the conduit 206 and which allows the conduit to pivot around the horizontal axis of the pin 201 as the buoyant member 200 travels downwardly with the surface level of the liquid in the reaction chamber during the removal of the treated wastewater. The weight of the float assembly 198 is selected so that the inlet end 208 of the conduit 206 is suspended slightly below the surface of the treated wastewater, allowing the treated wastewater from just below the surface to enter the inlet end of the conduit.

The outlet end 210 of the conduit 206 is connected to the inlet end 216 of the pipe 214. In an embodiment of the present invention, the outlet end 210 of the conduit 206 is connected to the inlet end 216 of the pipe 214 by a connector made of a flexible material to allow the conduit to pivot as the buoyant member 200 travels downwardly with the surface level of the liquid in the reaction chamber 166 during the removal of the treated wastewater. In certain embodiments of the present invention, the conduit 206 may be made of a flexible material to permit the conduit to pivot as the surface level of the liquid in the reaction chamber 166 falls due to removal of the treated wastewater, allowing the outlet end 210 of the conduit 206 to be directly connected to the inlet end 216 of the pipe 214 without requiring a connector.

The outlet end 218 of the pipe 214 is connected to a first opening of a connector conduit 229, as further described below.

As best shown in FIG. 10H, the treated wastewater is transferred from the reaction chamber 166 to a drain field or other destination such as for example, an irrigation system, by a sixth airlift pump (FIG. 6) comprising a pipe 220 having an inlet end 222 connected to a second opening of the connector conduit 229, an outlet 224 for discharging the treated wastewater to the drain field or other destination, and an air intake 226. When air is supplied through the air intake 226 of the sixth airlift pump, supernatant is drawn into the conduit 206 through the inlet opening 208 by gravity and by suction from that airlift, as indicated by the directional arrows in FIG. 3A. The withdrawn supernatant then enters the inlet opening 216 of the pipe 214 and proceeds downwardly to the outlet end 218 of the pipe, near the bottom of the tank 20. The supernatant passes through the connector conduit 229 and makes a substantial U-turn upwardly into the pipe 220 through the inlet opening 222 toward a curved portion 223 of the pipe 220, located above the highest expected liquid level in the reaction chamber 166. The apex of the curved portion 223 represents the maximum lifting force required by the sixth airlift pump to withdraw the supernatant from the third operational area 180; after liquid passes over that apex, gravity and siphoning effect will pull the supernatant from the third operational area.

As the supernatant is being removed from the third operational area 180, the water level in that area will have an initially rapid rate of descent due to the high beginning head pressure at the inlet end 216 of the pipe 214. As the float assembly 198 moves downwardly, approaching the activated sludge area 182 and falling below the inlet end 216 of the pipe 214, the head pressure declines and the flow rate from that reaction chamber 166 decreases so as not disturb the activated sludge accumulated in that area.

A drain field to which the supernatant is discharged may be a conventional subsurface drain field of the kind commonly used with conventional septic tanks utilizing perforated pipes buried in a bed of gravel, or may include a subsurface irrigation system. The drain field functions to dissipate the treated wastewater, which is not harmful to the surrounding environment and thus may be discharged without the drain-field area requirements associated with conventional septic tanks. Prior to discharging to a drain field or other destination, the treated wastewater may be exposed to an ultraviolet light source to kill any remaining bacteria in the treated wastewater.

Figure 9:
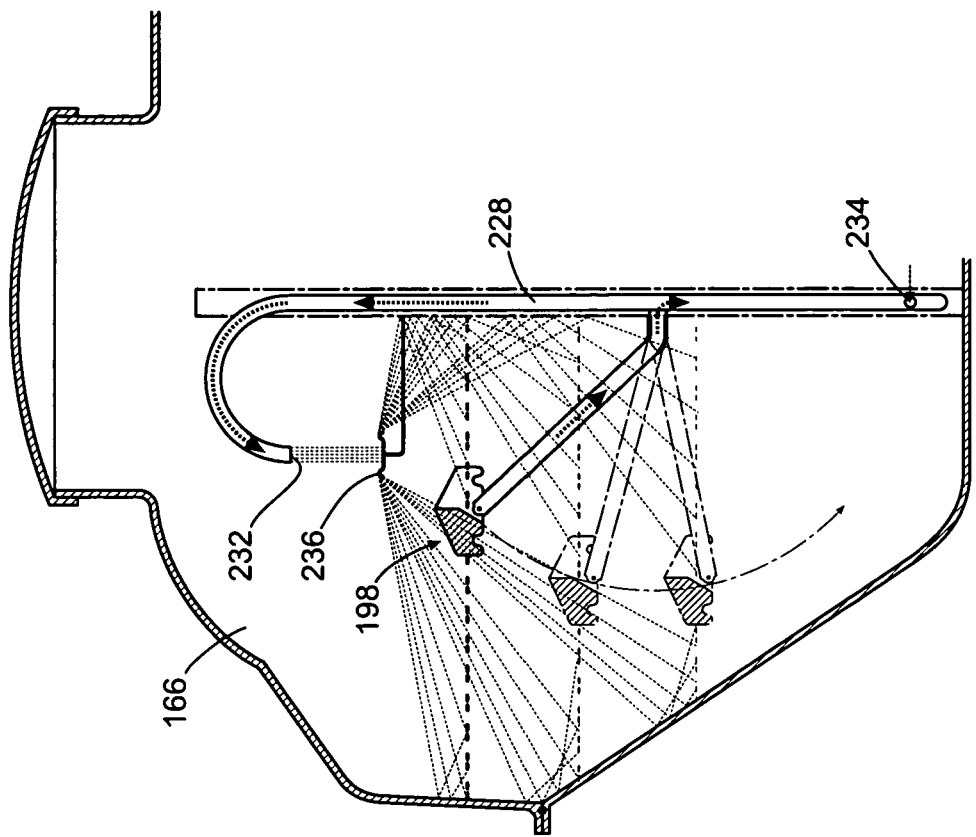
FIG. 9 is a fragmentary cross-sectional elevation view of the reaction chamber and a splatter plate of the wastewater treatment system in FIG. 1.

In certain embodiments of the present invention, a portion of the treated wastewater may be transferred from the reaction chamber 166 back to the reaction chamber to wash the walls of the chamber and disturb the surface of the treated wastewater to cause any microorganisms on the surface to settle to the activated sludge area 182. The portion of the treated wastewater is transferred from the reaction chamber 166 to the reaction chamber by a seventh airlift pump (FIG. 6) comprising a pipe 228 having an inlet end 230 connected to a third opening of the connector conduit 229 and an outlet end 232 located near the top of the reaction chamber for discharging the portion of treated wastewater into the reaction chamber. In an embodiment of the present invention, the upper end of the pipe 228 is curved to locate the outlet end 232 above and directed downwardly toward the maximum intended level of liquid in the reaction chamber 166, as shown in FIGS. 6 and 9. When air is supplied through an air intake opening 234 of the pipe 228, the treated wastewater is drawn into the conduit 206 through the inlet opening 208 by gravity and by suction from the seventh airlift pump, as indicated by the directional arrows of FIG. 9. The withdrawn treated wastewater then enters the inlet opening 216 of the pipe 214 and proceeds downwardly to the outlet end 218 of the pipe, near the bottom of the tank 20. The treated wastewater passes through the connector conduit 229 and makes a substantial U-turn upwardly into the pipe 228 through the inlet opening 230 toward the curved upper end of the pipe, located above the highest expected liquid level in the reaction chamber 166. The apex of the curved upper end of the pipe 228 represents the maximum lifting force required by the seventh airlift pump to withdraw the supernatant from the third operational area 180; after liquid passes over that apex, gravity and siphoning effect will pull the supernatant from the third operational area. Preferably, a splatter plate 236 is positioned below the outlet end 232 of the pipe 228 so that the treated wastewater discharged from the pipe hits the splatter plate and sprays onto the walls of the reaction chamber 166 and the surface of the treated wastewater to remove any microbes that may be remaining on those surfaces, as best shown in FIG. 9.

Figure 8:
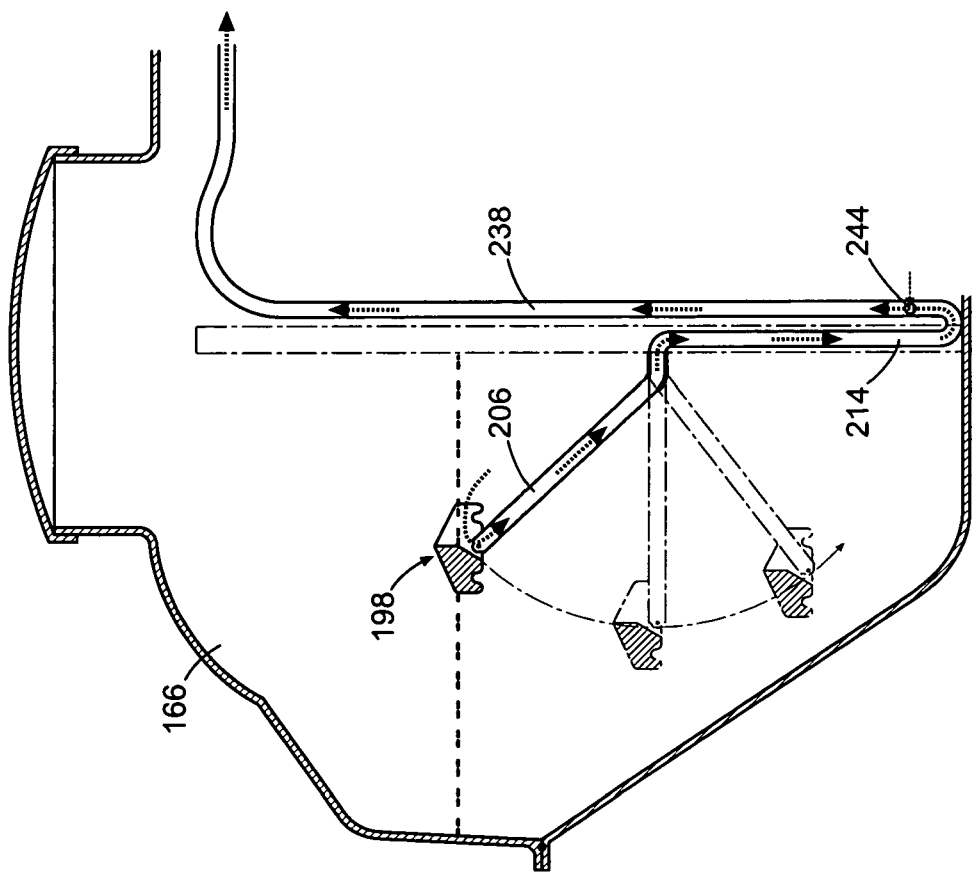
FIG. 8 is a fragmentary cross-sectional elevation view of a reaction chamber and the float assembly of the wastewater treatment system in FIG. 1.
Figure 10M:
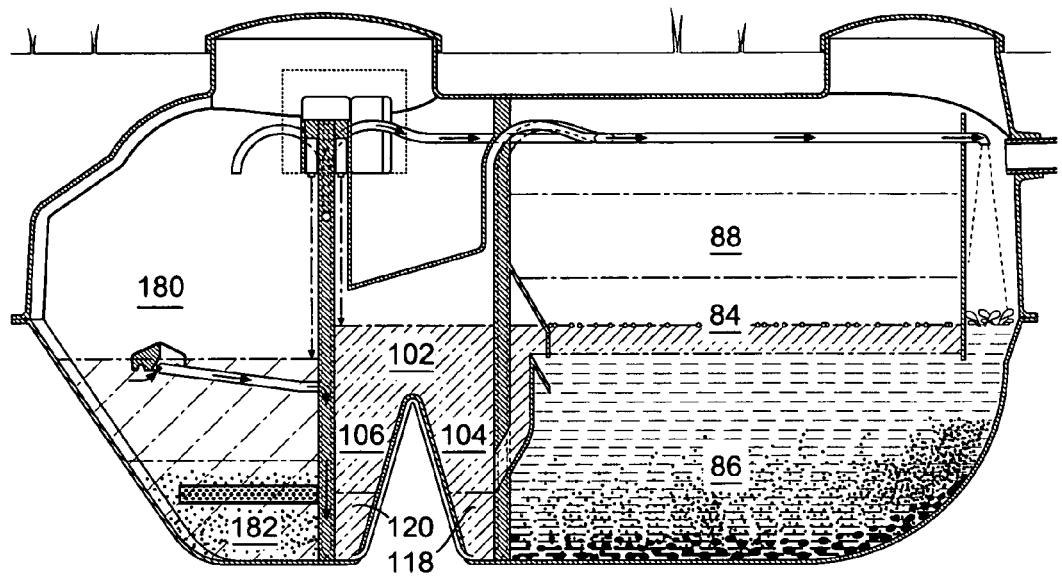

As illustrated in FIGS. 8 and 10M, in further embodiments of the present invention, the treated wastewater in the reaction chamber 166 may be transferred to the receiving chamber 50 via an eighth airlift pump to maintain the population of microorganisms in the reaction chamber 166 during times of low or no flow of new wastewater into the system 10. Similar to the airlift processes described above, the treated wastewater is transferred from the reaction chamber 166 to the receiving chamber 50 by the eighth airlift pump (FIG. 6) comprising a pipe 238 having an inlet end 240 connected to a fourth opening of the connector conduit 229 and an outlet end 242 connected to the common trunk line 40. As indicated by the directional arrows in FIG. 8, when air is supplied through an air intake opening 244 of the pipe 238, the treated wastewater is drawn into the conduit 206 through the inlet opening 208 by gravity and by suction from the eighth airlift pump. The withdrawn treated wastewater then enters the inlet opening 216 of the pipe 214 and proceeds downwardly to the outlet end 218 of the pipe, near the bottom of the tank 20. The treated wastewater passes through the connector conduit 229 and makes a substantial U-turn upwardly into the pipe 238 through the inlet opening 240. The treated wastewater flows into the common trunk line 40 through the outlet end 242 and into the receiving chamber 166 through the outlet end 42 of the common trunk line. As best shown in FIGS. 6B and 7, each of the pipes of the respective airlift pumps may be molded within the walls of the system 10.

As shown in FIG. 6, a multi-port valve 246, of the type described in U.S. patent application Ser. No. 10/227,712, now U.S. Pat. No. 6,932,112, which disclosure is incorporated herein, may be used to control the distribution of air from the air compressor 260 to the airlift pumps and air diffusers in the system 10. The multi-port valve 246 is preferably in communication with a system processor 248 associated with the treatment system 10, as illustrated in. The multi-port valve 246 is preferably located within the tank 20, in a compartment above the third side wall 92, as illustrated in FIG. 3. It will be understood that the positioning of the multi-port valve 246 within the tank 20 and above the third side wall 92, although preferred, is not a critical feature of the embodiment and that other suitable locations, such as outside the tank, may be substituted. The multi-port valve 246 includes a plurality of ports each connected to an airlift pump within the localized treatment system 10 to facilitate transfer of solid material and wastewater via airlift. Other ports of the multi-port valve 246 are connected to air diffusers within the system 10 to control the distribution of air to the air diffusers.

It will be understood that the choice of a multi-port valve 246 to control compressed air distribution in the disclosed embodiment, although preferred, is not a critical feature of that embodiment and that other suitable valves or the like may be substituted.

An exemplary operating environment for implementing the present invention includes the system processor 248 having a processing unit, a system memory, and a system bus that couples the system memory to the processing unit. The system memory contains the programmed instructions for operating the system 10. An interface connects to the system bus and sends and receives signals from the various sensors monitoring the operation of the wastewater treatment apparatus. Those sensors include the first and second ultrasonic sensors 156, 168 monitoring the volume of wastewater in the equalization and reaction chambers 90, 166, respectively, and the density sensor 186 monitoring the population of microorganisms in the reaction chamber. The interface also connects with a drive motor and sensors associated with the multi-port valve 246 to communicate with the multi-port valve. It should be understood that the system processor 248 may also send and receive signals through an external data link 258 (FIG. 11) from sources external to the components of the localized wastewater treatment system.

Those skilled in the art will realize that the system processor 248 also can be connected over any data or telecommunications network, such as the Internet, with an offsite central monitoring system as well as with other localized wastewater treatment systems embodied by the present invention. The system processor 248 can communicate any malfunctions or component failure to the central monitoring system and receive program updates and other information from the central monitoring system. This allows an operator at the central monitoring system to routinely monitor each localized wastewater treatment system in communication with the centralized monitoring system.

In order to decrease costs related to wastewater management infrastructure, municipalities may require new commercial and residential developments to install such localized treatment systems, rather than adding sewer lines and load to the existing centralized treatment facility. It should be understood that such localized sewage treatment systems may be owned by the individual property owner, by the municipality which may charge the property owner a fee for sewage treatment, or by an individual contractor which may also charge a sewage treatment fee.

It should also be understood that localized wastewater treatment systems according to the present invention offer substantial flexibility in treating wastewater. Although a particular treatment process is described herein, modified or different treatment processes may be substituted with little or no modification of the localized treatment apparatus.

Although the present invention has been described with reference to specific details of certain embodiments thereof, it is not intended that such details should be regarded as limitations upon the scope of the invention except as and to the extent that they are included in the accompanying claims.

The invention claimed is:

1. An apparatus for treating wastewater, the apparatus comprising:
   at least one operational area operative to receive a substantially continuous inflow of wastewater and having a predetermined volume;
   a treatment area separate from the at least one operational area;
   air-operated means operative to transfer a batch of the wastewater from the at least one operational area to the treatment area until a predetermined level of wastewater is reached in the treatment area; and
   means operative to withdraw a layer of the treated wastewater from the surface of the batch of wastewater in the treatment area at a rate of withdrawal that decreases as the surface of the wastewater falls within the treatment area, so as to reduce disturbance of a population of microorganisms that have settled out of the batch of wastewater into a settlement area at a lower level in the treatment area.

2. The apparatus of claim 1, further comprising means operative to reduce the population of microorganisms in the settlement area by transferring microorganisms to the at least one operational area.

3. The apparatus of claim 1, wherein the means operative to withdraw the treated wastewater comprises:
   a buoyant member operative to float at the surface of the wastewater in the treatment area;
   a conduit having an inlet operatively attached to the buoyant member, the conduit operative to receive the treated wastewater proximate to the surface of the wastewater; and
   an airlift pipe having an inlet connected to receive the treated wastewater flowing into the conduit and an outlet located above the inlet for dispersing the treated wastewater, the airlift pipe selectably receiving compressed air operative to lift the wastewater though the airlift pipe to the outlet for dispersal from the apparatus, so that the amount of lift required by the airlift pipe to lift the treated wastewater for dispersal increases as the level of the treated wastewater drops in response to removal of the wastewater from the treatment area, thereby reducing the rate of withdrawal from the treatment area.

4. The apparatus of claim 1, further comprising at least one solids area operative to receive solid material settling out of the wastewater in the at least one operational area.

5. The apparatus of claim 1, further comprising means operative to supply air to the batch of wastewater in the treatment area for a predetermined time to create a population of microorganisms for biological treatment of the batch of wastewater.

6. The apparatus of claim 1, wherein the settlement area comprises an activated sludge area operative to receive the population of microorganisms settling out of the batch of wastewater in the treatment area, so that treated wastewater remains above the activated sludge area.

7. The apparatus of claim 1, wherein the means operative to withdraw a layer of treated wastewater is operative to withdraw wastewater from adjacent the surface of the batch of treated wastewater without withdrawing material floating on the surface.

8. The apparatus of claim 1, further comprising:
   at least one solids settling area operative to receive solid material settling out of the wastewater in the at least one operational area;
   means operative to supply air to the batch of wastewater in the treatment area for a predetermined time to create a population of the microorganisms for biological treatment of the batch of wastewater;
   the settlement area comprises an activated sludge area operative to receive the population of microorganisms settling out of the batch of wastewater in the treatment area after the air is no longer supplied to the batch of wastewater, so that treated wastewater remains above the activated sludge area; and
   the means operative to withdraw a layer of treated wastewater is operative to withdraw wastewater from adjacent the surface of the batch of treated wastewater without withdrawing material floating on the surface.

9. An apparatus for treating wastewater, the apparatus comprising:
   a first operational area operative to receive a flow of wastewater, the first operational area having a certain volume;
   a holding area operative to receive an amount of the flow of wastewater that exceeds the volume of the first operational area;
   a first solids settling area operative to receive solid material settling out of the wastewater in the first operational area or the holding area;
   a second operational area;
   means operative to transfer wastewater from the first operational area to the second operational area;
   a second solids settling area operative to receive solid material settling out of the wastewater in the second operational area;
   a third operational area separate from the first and second operational areas;
   means operative to transfer a batch of the wastewater from the second operational area to the third operational area until a predetermined level of wastewater is reached in the third operational area;
   means operative to supply air to the batch of wastewater in the third operational area for a predetermined time to create a population of microorganisms for biological treatment of the batch of wastewater;
   an activated sludge area operative to receive the population of microorganisms settling out of the batch of wastewater in the third operational area after the air is no longer supplied to the batch of wastewater;
   means operative to remove a layer of the treated wastewater from adjacent to the surface of the batch of wastewater in the third operational area for dispersal; and
   means operative to reduce the population of microorganisms in the activated sludge area.

10. The apparatus of claim 9, wherein the first operational area, the holding area, and the first solids settling area are disposed within a receiving chamber.

11. The apparatus of claim 9, wherein the receiving chamber defines an inlet operative to receive the flow of wastewater into the apparatus and comprises a baffle disposed adjacent the inlet, the baffle operative to decrease the rate of flow of the wastewater before the wastewater is received within the receiving chamber.

12. The apparatus of claim 10, wherein the means operative to transfer wastewater from the first operational area to the second operational area comprises an outlet disposed at a level below the first operational area and operative to connect the first operational area to the second operational area, and a first baffle disposed adjacent the outlet and operative to prevent solid material floating to the surface of the wastewater in the receiving chamber from flowing over with the wastewater to the second operational area.

13. The apparatus of claim 12, wherein:
the second solids settling area is disposed below the second operational area; and
the outlet is operative to introduce the wastewater from the first operational area to the second operational area at a level above the second solids settling area.

14. The apparatus of claim 12, wherein the first baffle comprises:
a member having a proximal end located adjacent the outlet to the second operational area and extending downwardly at an acute angle to a distal end into the receiving chamber, wherein the proximal end of the member defines an apex located to define the threshold level from which wastewater in the first operational area can enter the second operational area through the outlet.

15. The apparatus of claim 12, further comprising a second baffle having a lower end extending below the apex defined by the first baffle so as to prevent the solid material floating at the surface of the wastewater in the receiving chamber from flowing over with the wastewater to the second operational area.

16. The apparatus of claim 9, wherein the second operational area, the second solids settling area, and the means operative to transfer a batch of the wastewater from the second operational area to the third operational area are disposed within an intermediate chamber.

17. The apparatus of claim 16, wherein the intermediate chamber further comprises a sensor operative to monitor the volume of wastewater in the second operational area.

18. The apparatus of claim 17, wherein the intermediate chamber further comprises a baffle assembly disposed above the second operational area to prevent solid material floating at the surface of the wastewater in the intermediate chamber from being transferred over with a batch of the wastewater to the third operational area.

19. The apparatus of claim 18, wherein the intermediate chamber further comprises means operative to transfer the solid material floating at the surface of the wastewater in the intermediate chamber from the intermediate chamber to a region including the first operational area.

20. The apparatus of claim 19, wherein the means operative to transfer the solid material floating at the surface of the wastewater in the intermediate chamber from the intermediate chamber to a region including the first operational area comprises a pipe extending from the intermediate chamber to an area including the first operational area, the pipe having:
an inlet end disposed adjacent the baffle assembly, the inlet end operative to receive the solid material floating at the surface of the wastewater;
an outlet end disposed within a region including the first operational area; and
means operative to selectably admit a flow of air into the pipe, thereby causing the solid material to be transferred from the intermediate chamber to a region including the first operational area.

21. The apparatus of claim 9, wherein the means operative to transfer a batch of the wastewater from the second operational area to the third operational area comprises a pipe extending from the second operational area to the third operational area, the pipe having:
an inlet end disposed within the second operational area, the inlet end operative to receive the wastewater in the second operational area;
an outlet end disposed above the third operational area, the outlet end operative to discharge the wastewater into the third operational area; and
means operative to selectably admit a flow of air into the pipe, thereby causing the batch of wastewater to be transferred from the second operational area to the third operational area.

22. The apparatus of claim 9, wherein the third operational area, the means operative to supply air to the batch of wastewater in the third operational area, the activated sludge area, the means operative to remove a layer of the treated wastewater from adjacent the surface of the batch of wastewater in the third operational area, and the means operative to reduce the population of microorganisms in the activated sludge area are disposed within a reaction chamber.

23. The apparatus of claim 22, wherein the reaction chamber further comprises a sensor operative to monitor the volume of wastewater in the reaction chamber.

24. The apparatus of claim 22, wherein the reaction chamber further comprises a sensor operative to monitor the population of microorganisms in the reaction chamber.

25. The apparatus of claim 9, wherein the means operative to remove a layer of the treated wastewater from adjacent the surface of the batch of wastewater in the third operational area for dispersal comprises a buoyant assembly floating on the surface of the wastewater in the third operational area, the buoyant assembly comprising:
a buoyant member; and
a conduit having an inlet operatively attached to the buoyancy element and operative to receive the treated wastewater adjacent to the surface of the batch of wastewater;
wherein the buoyant assembly has a weight sufficient to suspend the inlet of the conduit just below the surface of the wastewater in the third operational area.

26. The apparatus of claim 25, further comprising a pipe extending from the third operational area to exit the third operational area, the pipe having:
an inlet end operatively connected to the conduit and operative to receive the treated wastewater from the conduit;
an outlet end operative to discharge the treated wastewater from the third operational area; and
means operative to selectably admit a flow of air into the pipe so as to cause the treated wastewater to be transferred from the third operational area to the outlet end of the pipe.

27. The apparatus of claim 9, wherein the means operative to reduce the population of microorganisms in the activated sludge area comprises a pipe extending from the activated sludge area to a region including the first operational area, the pipe having:
an inlet end disposed within the activated sludge area and operative to receive a quantity of the population of microorganisms in the activated sludge area;
an outlet end disposed within a region including the first operational area, the outlet end operative to discharge the quantity of the population of microorganisms into a region including the first operational area; and
means operative to selectably admit a flow of air into the pipe, thereby causing the quantity of the population of microorganisms to be transferred from the activated sludge area to a region including the first operational area.

28. The apparatus of claim 9, further comprising means operative to transfer the solid material in the second solids settling area from the second solids settling area to a region including the first operational area, wherein the transferred solid material settles to the first solids settling area.

29. The apparatus of claim 28, wherein the means operative to transfer the solid material in the second solids settling area from the second solids settling area to a region including the first operational area comprises a pipe extending from the second solids settling area to a region including the first operational area, the pipe having:
   an inlet end disposed within the second solids settling area, the inlet end operative to receive the solid material in the second solids settling area;
   an outlet end disposed within a region including the first operational area, the outlet end operative to discharge the solid material into a region including the first operational area; and
   means operative to selectably admit a flow of air into the pipe thereby causing the solid material to be transferred from the second solids settling area to a region including the first operational area.

30. The apparatus of claim 9, further comprising a control unit operative to
   communicate with the means operative to transfer a batch of the wastewater from the second operational area to the third operational area until a predetermined level of wastewater is reached in the third operational area;
   communicate with the means operative to supply air to the batch of wastewater in the third operational area for a predetermined time to create a population of microorganisms for biological treatment of the batch of wastewater;
   communicate with the means operative to remove a layer of the treated wastewater from below the surface of the batch of wastewater in the third operational area for dispersal; and
   communicate with the means operative to reduce the population of microorganisms in the activated sludge area.

31. An apparatus for treating wastewater, the apparatus comprising:
   a first operational area operative to receive a flow of wastewater, the first operational area having a volume;
   a holding area operative to receive an amount of the flow of the wastewater that exceeds the volume of the first operational area;
   a first solids settling area operative to receive solid material settling out of the wastewater in the first operational area or the holding area;
   a second operational area operatively connected to the first operational area to permit the wastewater in the first operational area to flow to the second operational area, wherein when the wastewater in the first operational area flows to the second operational area, the wastewater in the holding area moves into the first operational area;
   a partition operative to divide a portion of the second operational area into a first region and a second region;
   a second solids settling area operative to receive solid material settling out of the wastewater in the second operational area;
   a third solids settling area operative to receive solid material settling out of the wastewater in the second operational area, the third solids settling area separated from the second solids settling area by the partition;
   means operative to transfer the solid material from the second solids settling area to a region including the first operational area, wherein the transferred solid material settles to the first solids settling area;
   means operative to transfer the solid material from the third solids settling area to a region including the first operational area, wherein the transferred solid material settles to the first solids settling area;
   a third operational area;
   means operative to transfer a batch of the wastewater from the second operational area to the third operational area until a predetermined level of wastewater is reached in the third operational area so that the batch of wastewater in the third operational area is separated from the flow of wastewater into the first operational area;
   means operative to supply air to the batch of wastewater in the third operational area for a predetermined time to create a population of microorganisms for biological treatment of the batch of wastewater;
   an activated sludge area operative to receive the population of microorganisms settling out of the wastewater in the third operational area after the air is no longer supplied to the batch of wastewater;
   means operative to remove a layer of the treated wastewater from just below the surface of the batch of wastewater in the third operational area for dispersal; and
   means operative to transfer a quantity of the population of microorganisms from the activated sludge area to a region including the first operational area.

32. The apparatus of claim 31, wherein the first operational area, the holding area, and the first solids settling area are disposed within a receiving chamber.

33. The apparatus of claim 31, wherein the second operational area, the partition, the second solids settling area, the third solids settling area, the means operative to transfer the solid material from the second solids settling area to a region including the first operational area, the means operative to transfer the solid material from the third solids settling area to a region including a first operational area, and the means operative to transfer a batch of the wastewater from the second operational area to the third operational area are disposed within an intermediate chamber.

34. The apparatus of claim 31, wherein the means operative to transfer the solid material from the second solids settling area to the first operational area comprises a pipe extending from the second solids settling area to a region including the first operational area, the pipe having:
   an inlet end disposed within the second solids settling area, the inlet end operative to receive the solid material in the second solids settling area;
   an outlet end disposed within a region including the first operational area, the outlet end operative to discharge the solid-material into a region including the first operational area; and
   means operative to selectably admit a flow of air into the pipe, thereby causing the solid material to be transferred from the second solids settling area to a region including the first operational area.

35. The apparatus of claim 31, wherein the means operative to transfer the solid material from the third solids settling area to a region including the first operational area comprises a pipe extending from the third solids settling area to a region including the first operational area, the having:
   an inlet end disposed within the third solids settling area, the inlet end operative to receive the solid material in the third solids settling area;

an outlet end disposed within a region including the first operational area, the outlet end operative to discharge the solid material into a region including the first operational area; and means operative to selectably admit a flow of air into the pipe, thereby causing the solid material to be transferred from the third solids settling area to a region including the first operational area.

36. The apparatus of claim 31, wherein the third operational area, the means operative to supply air to the batch of wastewater in the third operational area; the activated sludge area; the means operative to remove a layer of the treated wastewater from below the surface of the batch of wastewater in the third operational area; and the means operative to transfer a quantity of the population of microorganisms from the activated sludge area to the first operational area are disposed within a reaction chamber.

37. The apparatus of claim 31, wherein the means operative to remove a layer of the treated wastewater from below the surface of the batch of wastewater in the third operational area for dispersal comprises a buoyant assembly floating on the surface of the batch of wastewater in the third operational area, the buoyant assembly comprising:

a buoyant member; and a conduit having an inlet operatively attached to the buoyant member, the conduit operative to receive the treated wastewater adjacent to the surface of the batch of wastewater;

wherein the buoyant assembly has a weight sufficient to suspend the inlet of the conduit just below the surface of the batch of wastewater in the third operational area.

38. The apparatus of claim 37, further comprising a pipe assembly including:

a first pipe having an inlet end operatively connected to the conduit and an outlet end, the inlet end operative to receive the treated wastewater from the conduit, the outlet end operative to discharge the treated wastewater;

a second pipe having:
  an inlet end integrally connected to the outlet end of the first pipe, the inlet end operative to receive the treated wastewater from the first pipe;
  an outlet end operative to discharge the treated wastewater from the third operational area; and
  means operative to selectably admit a flow of air into the second pipe so as to cause treated wastewater to be transferred from the third operational area to the outlet end of the second pipe; and a third pipe having:
  an inlet end integrally connected to the outlet end of the first pipe, the inlet end operative to receive the treated wastewater from the first pipe;
  an outlet end disposed within a region including the first operational area, the outlet end operative to discharge the treated wastewater into a region including the first operational area; and
  means operative to selectably admit a flow of air into the third pipe thereby causing the treated wastewater to be transferred from the third operational area to a region including the first operational area.

39. The apparatus of claim 38, wherein the pipe assembly further includes a fourth pipe, the fourth pipe having:
  an inlet end integrally connected to the outlet end of the first pipe, the inlet end operative to receive the treated wastewater from the first pipe;
  an outlet end disposed above the third operational area, the outlet end operative to discharge the treated wastewater into the third operational area;
  a splatter plate extending outwardly from the fourth pipe and disposed below the outlet end of the fourth pipe, the splatter plate operative to deflect the treated wastewater discharged from the outlet end of the fourth pipe; and
  means operative to selectably admit a flow of air into the fourth pipe thereby causing the treated wastewater to be transferred from the third operational area to the third operational area.

40. The apparatus of claim 31, further comprising means operative to transfer the wastewater from the first region and the second solids settling area of the second operational area to the third solids settling area of the second operational area.

41. The apparatus of claim 40, wherein the means operative to transfer the wastewater from the first region and the second solids settling area of the second operational area to the third solids settling area of the second operational area comprises a siphon conduit having:
  an inlet end disposed within the second solids settling area, the inlet end operative to receive the wastewater in the second solids settling area;
  an outlet end disposed within the third solids settling area, the outlet end operative to discharge the wastewater into the third solids settling area; and
  an intermediate point disposed at a level above the inlet end and the outlet end.

42. A system for treating wastewater, the system comprising:
  a first operational area operative to receive a continuous flow of wastewater, the first operational area having a volume;
  a holding area operative to receive an amount of the flow of the wastewater that exceeds the volume of the first operational area;
  a first solids settling area operative to receive solid material settling out of the wastewater;
  a second operational area;
  means operative to transfer wastewater from the first operational area to the second operational area;
  a second solids settling area operative to receive solid material settling out of the wastewater in the second operational area;
  a third operational area separate from the first and second operational areas;
  means operative to transfer a batch of the wastewater from the second operational area to the third operational area until a predetermined level of wastewater is reached in the third operational area;
  means operative to supply air to the batch of wastewater in the third operational area for a predetermined time to create a population of microorganism for biological treatment of the batch of wastewater;
  an activated sludge area operative to receive the population of microorganisms settling out of the wastewater after the air is no longer supplied to the batch of wastewater;
  means operative to remove a layer of the treated wastewater from below the surface of the batch of wastewater in the third operational area for dispersal;
  means operative to reduce the population of microorganisms in the activated sludge area; and
  a control unit associated with the means operative to transfer a batch of the wastewater from the second operational area to the third operational area until a predetermined level of wastewater is reached in the third operational area, the means operative to supply air to the batch of wastewater in the third operational area for a predetermined time to create a population of microorganism for biological treatment of the batch of wastewater, the means operative to remove a layer of the treated wastewater from below the surface of the batch of wastewater in the third operational area, and the means operative to reduce the population of microorganisms in the activated sludge area, the control unit operative to continually determine the volume of the wastewater in the second operational area;

determine a volume of the batch of wastewater to be transferred to the third operational area;

communicate with the means operative to transfer a batch of the wastewater from the second operational area to the third operational area when to begin the transfer and when to end the transfer of the batch of wastewater based on the determined volume of the batch wastewater;

determine the population of microorganisms in the activated sludge area;

determine a period of time to supply air to the batch of wastewater in the third operational area based on the volume of the batch of wastewater and the population of microorganisms;

communicate with the means operative to supply air to the batch of wastewater in the third operational area when to supply air and when to end supplying air based on the determined period of time to supply air;

determine a period of time to allow the population of microorganisms to settle out of the wastewater after the air is turned off;

communicate with the means operative to remove a layer of the treated wastewater from below the surface of the batch of wastewater in the third operational area when to begin removal and when to end the removal based on the determined period of time to allow the population of microorganisms to settle and on the determined volume of the batch of wastewater;

after the determined period of time to supply air, determine the population of microorganisms in the activated sludge area; and communicate with the means operative to reduce the population of microorganisms in the activated sludge area a quantity of the population of microorganisms to reduce based on the determined population of microorganisms after the predetermined period of time to supply air.

* * * * *